(12) United States Patent
Choudhary et al.

(10) Patent No.: US 12,437,361 B2
(45) Date of Patent: Oct. 7, 2025

(54) METHOD AND ELECTRONIC DEVICE FOR APPLYING ADAPTIVE ZOOM ON AN IMAGE

(71) Applicant: SAMSUNG ELECTRONICS CO., LTD., Suwon-si (KR)

(72) Inventors: Choice Choudhary, Ghaziabad (IN); Himani Himani, Gurgaon (IN); Arungeeth Plamtharayil Sugathan, Noida (IN); Vishwajeet Shukla, Gorakhpur (IN); Mrinal Malik, Alwar (IN); Harshit Oberoi, Delhi (IN); Anup Verma, Kanpur (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 398 days.

(21) Appl. No.: 18/119,732

(22) Filed: Mar. 9, 2023

(65) Prior Publication Data
US 2023/0214960 A1    Jul. 6, 2023

Related U.S. Application Data

(63) Continuation of application No. PCT/KR2021/012285, filed on Sep. 9, 2021.

(30) Foreign Application Priority Data

Sep. 9, 2020 (IN) .............................. 202041038915

(51) Int. Cl.
G06T 3/4007 (2024.01)
G06T 5/70 (2024.01)

(52) U.S. Cl.
CPC .............. *G06T 3/4007* (2013.01); *G06T 5/70* (2024.01); *G06T 2207/20012* (2013.01); *G06T 2207/20021* (2013.01); *G06T 2207/20084* (2013.01)

(58) Field of Classification Search
CPC ..................... G06T 3/4007; G06T 5/70; G06T 2207/20012; G06T 2207/20021;
(Continued)

(56) References Cited

U.S. PATENT DOCUMENTS 10,142,549 B2    11/2018 Wang
10,194,089 B2 *   1/2019 Nash .................... H04N 13/239
(Continued)

FOREIGN PATENT DOCUMENTS

CN    102254300 A      11/2011
CN    103260081 A  *   8/2013
(Continued)

OTHER PUBLICATIONS

International Search Report (PCT/ISA/210) issued by the International Searching Authority on Dec. 7, 2021 in corresponding International Application No. PCT/KR2021/012285.
(Continued)

*Primary Examiner* — Jose L Couso
(74) *Attorney, Agent, or Firm* — Sughrue Mion, PLLC

(57) ABSTRACT

A method for applying adaptive zoom on an image is disclosed. The method includes detecting at least one input to perform zoom on the image, determining key pixels in the image, obtaining a plurality of segments by determining sizes of each of the plurality of the segments based on a number of the key pixels in each of the plurality of the segments, determining a priority order for zooming the plurality of the segments based on a density of the key pixels in each of the plurality of the segments, determining a zoom level to be applied on each of the plurality of the segments based on the density of the key pixels in each of the plurality of the segments, and adaptively zooming each of the plurality of the segments based on the zoom level and the priority order.

15 Claims, 21 Drawing Sheets

(58) Field of Classification Search
CPC ............. G06T 2207/20084; G06T 3/14; G06T
3/4069; G06T 3/4053; G06T 3/4046;
G06T 5/60; G06T 9/002; G06T
2207/20076; G06T 2207/20081; H04N
23/69; H04N 23/698; H04N 19/59; G02B
7/282; G02B 13/02; G02B 13/009; G06N
3/02; G06N 3/08–088; G06N 3/0445;
G06N 3/0454; G06N 3/0464; G06N
3/4046; G06N 3/4053; G06N 7/00; G06N
7/01; G06N 20/00; G06K 7/1482; G06V
10/454; G06V 10/54; G06V 10/774;
G06V 10/82; G06V 20/41; G06V
30/18057; G06V 20/698; G06V
30/19173; G06F 18/214; G06F 18/22;
G06F 18/241; G06F 18/24; G06F
18/2411; G06F 18/2415; G06F 30/27;
Y10S 128/925
See application file for complete search history.

(56) References Cited

U.S. PATENT DOCUMENTS

| | | | |
|---|---|---|---|
| 10,313,417 B2 * | 6/2019 | Chen | .................... H04N 19/105 |
| 10,764,588 B2 | 9/2020 | Fu et al. | |
| 2004/0095485 A1 * | 5/2004 | Ueda | ...................... H04N 23/60 |
| | | | 348/240.1 |
| 2008/0226148 A1 | 9/2008 | Gu et al. | |
| 2010/0097491 A1 * | 4/2010 | Farina | .................. H04N 23/843 |
| | | | 348/223.1 |
| 2016/0028966 A1 * | 1/2016 | Sheikh | ....................... G06T 3/60 |
| | | | 348/240.2 |
| 2016/0248984 A1 * | 8/2016 | Li | .............................. G06T 5/73 |
| 2018/0075581 A1 | 3/2018 | Shi et al. | |
| 2020/0219229 A1 | 7/2020 | Sundaram et al. | |

FOREIGN PATENT DOCUMENTS

| | | | | | |
|---|---|---|---|---|---|
| CN | 105227831 | A | * | 1/2016 | ................ G06T 3/40 |
| CN | 103428427 | B | * | 6/2016 | ................ G06T 3/40 |
| EP | 1 492 051 | A2 | | 12/2004 | |
| JP | 2006-50480 | A | | 2/2006 | |
| JP | 2017509961 | A | * | 4/2017 | ........... G06T 3/4007 |
| KR | 10-2012-0095132 | A | | 8/2012 | |
| KR | 10-2019-0023846 | A | | 3/2019 | |
| KR | 20190023846 | A | * | 3/2019 | ........... G06T 3/4084 |

OTHER PUBLICATIONS

Communication dated May 13, 2022, issued by the Indian Patent Office in counterpart Indian Application No. 202041038915.

* cited by examiner

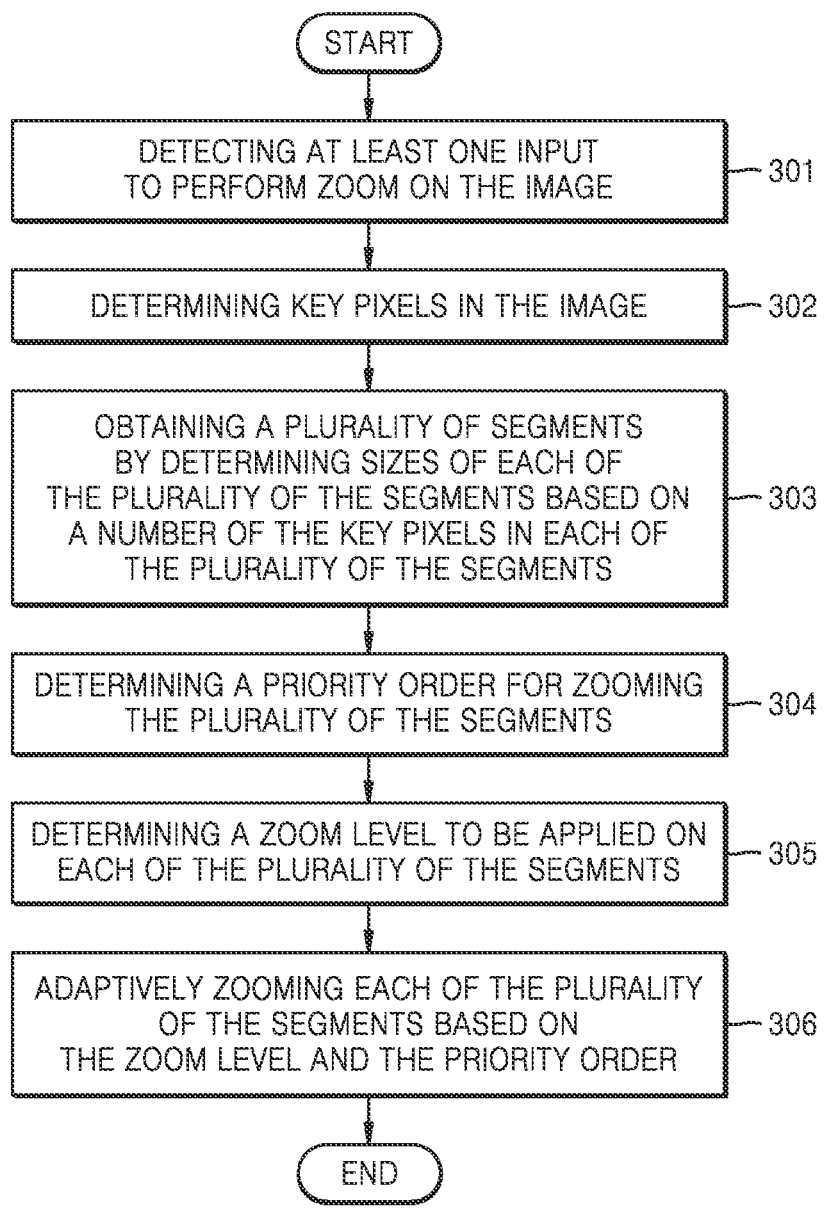

● : neighboring pixel

METHOD AND ELECTRONIC DEVICE FOR APPLYING ADAPTIVE ZOOM ON AN IMAGE

CROSS-REFERENCE TO RELATED APPLICATIONS

This application is a by-pass continuation of International Application No. PCT/KR2021/012285, filed on Sep. 9, 2021, which is based on and claims priority to Indian Patent Application No. 202041038915, filed on Sep. 9, 2020, the disclosures of which are incorporated by reference herein in their entireties.

BACKGROUND

1. Field

The present disclosure relates to image processing, and more specifically to a method and electronic device for applying adaptive zoom on an image.

2. Description of Related Art

Generally, zooming an image leads to degradation in an image quality such as blurring, missing details, and the like. Every part of the image is zoomed with the same scale. For example, when the image is zoomed with X magnitude zoom scale, where X is an integer, X^2 pixels are generated for one pixel of an original image, and this results in more computation and time to generate an up-scaled image. The up-scaled image is obtained through an upscale operation. The upscale operation requires more resources as a greater number of new pixels needs to be generated while zooming the image.

Moreover, in an existing zoom operation, every area in the image is processed with the same importance and zooming is performed equally on every area. There is a need for an approach where the image zooming is performed with less time and good quality considering a characteristic of the image to be zoomed.

SUMMARY

Provided is a method and electronic device for applying adaptive zoom on an image based a zoom level and a priority order.

The disclosure creates segments of the image. Each segment is associated with a dynamic size determined based on a number of important pixels available in each of the segment.

The disclosure determines a priority order for zooming each of the segments based on at least one important Region of Interest (ROI) available in the at least one segment from segments of the image.

The disclosure determines a zoom level to be applied on each of the segment of the image based on a density of the important pixels in each of the segment.

The disclosure applies a binary mask to cluster the important pixels and unimportant pixels of a plurality of pixels of the image.

According to the present disclosure, computation and time to generate an up-scaled image can be reduced, and a quality of the up-scaled image can be enhanced.

According to an aspect of the disclosure, a method for applying an adaptive zoom on an image includes: identifying one or more key pixels in the image; dividing the image into a plurality of segments; determining, for each respective segment of the plurality of segments, a size of the respective segment based on a number of the one or more key pixels located within the respective segment; determining a priority order for zooming each segment of the plurality of the segments based on a density of the one or more key pixels located within each respective segment of the plurality of the segments; determining, for each respective segment of the plurality of segments, a zoom level to be applied to the respective segment based on the density of the one or more key pixels located within the respective segment; and adaptively zooming each respective segment of the plurality of the segments based on the determined zoom level and the determined priority order.

Each segment of the plurality of segments may include a rectangle, and wherein the dividing the image into the plurality of the segments may include: identifying one or more groups of adjacent key pixels from among the identified one or more key pixels; encapsulating the one or more of the identified groups of adjacent key pixels within one or more segments of the plurality of segments; determining, for each respective segment of the plurality of segments, whether a size of the respective segment is smaller than a maximum threshold size; for each respective segment determined to have a size smaller than the maximum threshold size, expanding the respective segment in at least one of a horizontal direction and a vertical direction until the respective segment reaches the maximum threshold size or a boundary of the respective segment reaches a boundary of another segment from among the plurality of segments; and encapsulating one or more adjacent non-key pixels not included in a segment of the plurality of segments within a segment of the plurality of segments.

The determining one or more key pixels of the image may include: generating a first blurred image by upscaling the image; generating a second blurred image by downscaling the image; obtaining a plurality of differential pixels of a differential image by subtracting pixel values of the first blurred image from pixel values of the second blurred image; comparing a current differential pixel from among the plurality of differential pixels with a plurality of neighboring differential pixels adjacent to the current differential pixel; determining whether the current differential pixel is greater than a predetermined number of the plurality of neighboring differential pixels; determining whether the current differential pixel is an edge pixel or a corner pixel; and based on determining that the current differential pixel is greater than the predetermined number of the plurality of neighboring differential pixels and also determining that the current differential pixel is the edge pixel or the corner pixel, identifying a current pixel of the image corresponding to the current differential pixel and identifying the current pixel as a key pixel among the one or more key pixels.

The determining whether the current differential pixel is the edge pixel or the corner pixel may include: obtaining a ratio of two eigen values of a hessian matrix for the current differential pixel; and based on the ratio being smaller than a predetermined edge threshold, identifying the current pixel as a key pixel among the one or more key pixels.

Adaptively zooming each respective segment of the plurality of the segments based on the determined zoom level and the determined priority order may include: determining, for each respective segment of the plurality of segments in an order based on the determined priority order, a first zoom level for an Artificial intelligence (AI) zoom and a second zoom level for a bilinear zoom based on the density of the one or more key pixels located within the respective segment; and performing zoom, on each respective segment of the plurality of segments, by applying at least one of the AI zoom and the bilinear zoom according to the determined first zoom level and the second zoom level for the respective segment.

The AI zoom may generate an interpolated pixel based on bi-cubic interpolation with assigning a greater weight to a neighboring pixel determined to be a key pixel among the one or more key pixels.

The bilinear zoom may generate an interpolated pixel by one shot interpolation using a plurality of original pixels in a single step.

The method for applying an adaptive zoom on an image may further include: generating, for a plurality of images, a plurality of image identifiers, a plurality of hashed keys using a hash function model, and a bit map indicating location of one or more key pixels; and storing the plurality of image identifiers, the plurality of hashed keys, and the bitmap of the plurality of images in a database.

Each hashed key of the plurality of hashed keys may be a unique key associated with a respective image of the plurality of the images, and the plurality of image identifiers may include a plurality of bit arrays indicating features of each of the plurality of the images obtained by a neural network and at least one of a segment coordinates, a segment priority information, and a binary bitmap.

According to an aspect of the disclosure, an electronic device for applying adaptive zoom on an image may include: at least one memory; at least one processor; and an adaptive zoom controller communicatively connected to the at least one memory and the at least one processor, wherein the adaptive zoom controller is configured to: identify one or more key pixels in the image; divide the image into a plurality of segments; determine, for each respective segment of the plurality of segments, a size of the respective segment based on a number of the one or more key pixels located within the respective segment; determine a priority order for zooming each segment of the plurality of the segments based on a density of the one or more key pixels located within each respective segment of the plurality of the segments; determine, for each respective segment of the plurality of segments, a zoom level to be applied to the respective segment based on the density of the one or more key pixels located within the respective segment; and adaptively zoom each respective segment of the plurality of the segments based on the determined zoom level and the determined priority order.

Each segment of the plurality of segments may include a rectangle, and wherein, to obtain the plurality of segments, the adaptive zoom controller may be further configured to: identify one or more groups of adjacent key pixels from among the identified one or more key pixels; encapsulate the one or more of the identified groups of adjacent key pixels within one or more segments of the plurality of segments; determine, for each respective segment of the plurality of segments, whether a size of the respective segment is smaller than a maximum threshold size; for each respective segment determined to have a size smaller than the maximum threshold size, expand the respective segment in at least one of a horizontal direction and a vertical direction until the respective segment reaches the maximum threshold size or a boundary of the respective segment reaches a boundary of another segment from among the plurality of segments; and encapsulate one or more adjacent non-key pixels not included in a segment of the plurality of segments within a segment of the plurality of segments.

To determine the one or more key pixels, the adaptive zoom controller may be further configured to: generate a first blurred image by upscaling the image; generate a second blurred image by downscaling the image; obtain a plurality of differential pixels of a differential image by subtracting pixel values of the first blurred image from pixel values of the second blurred image; compare a current differential pixel from among the plurality of differential pixels with a plurality of neighboring differential pixels adjacent to the current differential pixel; determine whether the current differential pixel is greater than a predetermined number of the plurality of neighboring differential pixels; determine whether the current differential pixel is an edge pixel or a corner pixel; based on determining that the current differential pixel is greater than the predetermined number of the plurality of neighboring differential pixels and also determining that the current differential pixel is the edge pixel or the corner pixel, identify a current pixel of the image corresponding to the current differential pixel and identify the current pixel as a key pixel among the one or more key pixels.

The adaptive zoom controller may be further configured to obtain a ratio of two eigen values of a hessian matrix for the current differential pixel, and based on the ratio being smaller than a predetermined edge threshold, identify the current pixel as a key pixel among the one or more key pixels.

The adaptive zoom controller may be further configured to: determine, for each respective segment of the plurality of segments in an order based on the determined priority order, a first zoom level for an Artificial intelligence (AI) zoom and a second zoom level for a bilinear zoom based on the density of the one or more key pixels located within the respective segment; and perform zoom, on each respective segment of the plurality of segments, by applying at least one of the AI zoom and the bilinear zoom according to the determined first zoom level and the second zoom level for the respective segment.

The adaptive zoom controller may be further configured to: generate, for a plurality of images, a plurality of image identifiers, a plurality of hashed keys using a hash function model, and a bit map indicating location of the one or more key pixels; and store the plurality of image identifiers, the plurality of hashed keys, and the bit map of the plurality of images in a database.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein should be understood to include all such modifications.

BRIEF DESCRIPTION OF THE DRAWINGS

The above and other aspects, features, and advantages of certain embodiments of the present disclosure will be more apparent from the following description taken in conjunction with the accompanying drawings, wherein like reference numbers indicates corresponding parts, and in which:

FIG. 3A illustrates a flow chart of a method for applying adaptive zoom on the image, according to an embodiment.

DETAILED DESCRIPTION

Figure 1:
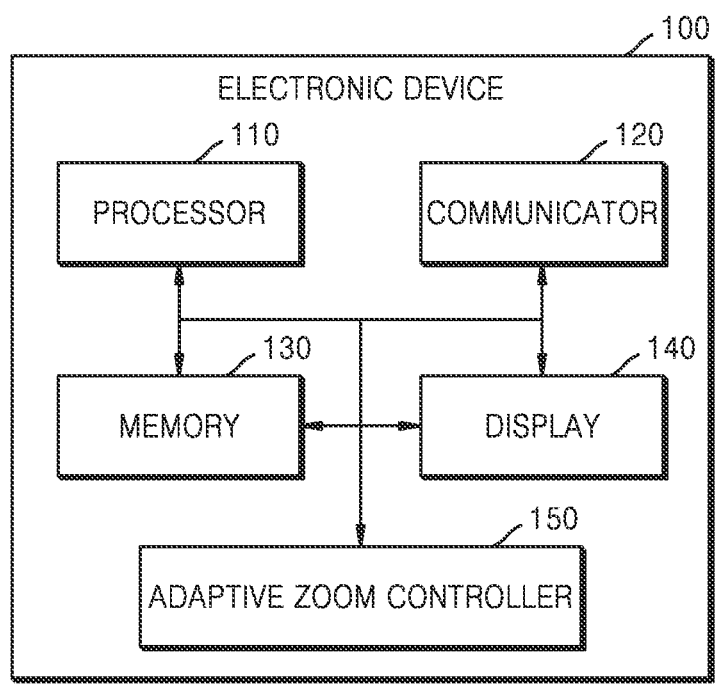
FIG. 1 illustrates an electronic device, according to an embodiment.

The embodiments disclosed herein and the various features and advantageous details thereof are explained more fully with reference to the non-limiting embodiments that are illustrated in the accompanying drawings and detailed in the following description. Descriptions of well-known components and processing techniques may be omitted. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be implemented and to further enable those skilled in the art to implement the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hard-wired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein provides a method for applying an adaptive zoom on an image. The method comprises detecting at least one input to perform zoom on the image, determining key pixels in the image, obtaining a plurality of segments by determining sizes of each of the plurality of the segments based on a number of the key pixels in each of the plurality of the segments, determining a priority order for zooming the plurality of the segments based on a density of the key pixels in each of the plurality of the segments, determining a zoom level to be applied on each of the plurality of the segments based on the density of the key pixels in each of the plurality of the segments, and adaptively zooming each of the plurality of the segments based on the zoom level and the priority order.

Furthermore, the embodiments herein provides a method for applying adaptive zoom on an image. The method includes detecting, by an electronic device, at least one input to perform a zoom on the image. The method further includes determining, by the electronic device, important pixels from a plurality of pixels in the image. The method further includes creating, by the electronic device, a plurality of segments of the image. Each of the segment is associated with a dynamic size determined based on a number of the important pixels available in each of the segment. The method includes determining, by the electronic device, a priority order for zooming each of the segment based on at least one important Region of Interest (ROI) available in the at least one segment from the plurality of segments of the image. The method further includes determining, by the electronic device, a zoom level to be applied on each of the segment of the image based on a density of the important pixels in each of the segment. The method further includes adaptively zooming, by the electronic device, each of the segment of the image based on the zoom level and the priority order.

According to the embodiment of the present disclosure, the electronic device performs the adaptive zooming on the image based on zoom level and a priority order. The electronic device first converts the image into segments. The electronic device then determines a pixel density of each segments to perform the adaptive zooming. The adaptive zooming results in new pixels generation in the image.

Referring now to the drawings, and more particularly to FIGS. 1 through 15b, where similar reference characters denote corresponding features consistently throughout the figures, there are shown preferred embodiments.

FIG. 1 illustrates an electronic device (100), according to an embodiment as disclosed herein. In an embodiment, the electronic device (100) includes a processor (110), a communicator (120), memory (130), a display (140), and an adaptive zoom controller (150). The processor (110) is coupled with the memory (130), the communicator (120) and the display (140). The electronic device (100) may be, for example, a smart watch, a smart phone, an AI speaker, an IoT sensor, a laptop, a smart social robot, a Personal Digital Assistant (PDA), a tablet computer, a laptop computer, a music player, a video player, or the like, but not limited to the afore-mentioned devices.

In an embodiment, the adaptive zoom controller (150) is configured to detect at least one input to perform a zoom on the image. The adaptive zoom controller (150) is configured to determine key pixels from a plurality of pixels in the image. Key pixel may indicate a pixel included in an important area such as ROI (Region Of Interest) in the image. Important area indicates an area which has at least one of characteristics such as frequency difference, edge information, color variation, gradient change and so on. Key pixel can be a pixel on an object of the image. For any object in the image, interesting points corresponding to key pixel candidates on the object can be extracted to provide a feature description of the object. In the embodiment, the key pixels included in the object can be determined by using feature detection algorithm such as SIFT (scale-invariant feature transform), RIFT (rotation-invariant generalization), Root-SIFT, G-RIF (Generalized Robust Invariant Feature), SURF (Speeded Up Robust Features) and so on, but not limited to the afore-mentioned feature detection algorithm. Non-key pixel indicates a pixel included in a non-important area. Non-important area indicates an area where there is no considerable change in terms of frequency or intensities with respect to neighboring pixels. Non-key pixel can be a pixel not located on the object of the image.

The adaptive zoom controller (150) is configured to create a plurality of segments of the image. A size of a current segment among the plurality of segments may be determined based on a number of the key pixels available included in the current segment. Each of the segments is associated with a dynamic size determined based on a number of the key pixels available in each of the segments. The size of each of segments can be determined based on the key pixel included in the each of segments, and the sizes of segments may be different from each other. The adaptive zoom controller (150) is configured to determine a priority order for zooming the plurality of segments based on at least one important Region of Interest (ROI) available in the image. The adaptive zoom controller (150) is configured to determine a priority order for zooming the plurality of segments based on a density of the key pixels in each of the plurality of the segments. The adaptive zoom controller (150) is further configured to determine a zoom level to be applied on each of the segments based on a density of the key pixels in each of the segments. The adaptive zoom controller (150) is configured to adaptively zoom each of the segments of the image based on the zoom level and the priority order.

In an embodiment, the adaptive zoom controller (150) is configured to use a binary mask to cluster the key pixels and non-key pixels of the plurality of pixels of the image. The binary mask may be a rectangle having a predetermined size and includes 0 or 1 as its components. A binary value corresponding to the key pixel may be set as 1, and a binary value corresponding to the non-key pixel may be set as 0. Alternatively, a binary value corresponding to the key pixel may be set as 0, and a binary value corresponding to the non-key pixel may be set as 1. A binary value in the binary mask can be set arbitrarily. The adaptive zoom controller (150) is configured to encapsulate one or more adjacent key pixels into the rectangle, i.e. the binary mask. The adaptive zoom controller (150) determines whether a size of the rectangle is smaller than a maximum threshold size, and expands the rectangle among a plurality of rectangles in at least one of horizontal and vertical direction until the rectangle reaches the maximum threshold size or the rectangle reaches other rectangle in case that the size of the rectangle is smaller than the maximum threshold size. The adaptive zoom controller (150) encapsulates one or more adjacent non-key pixels not included in any rectangle into one or more separate rectangles, and determines rectangles as the segments.

In another embodiment, the adaptive zoom controller (150) is configured to encapsulate each of the clustered key pixels into at least one bonding box. The adaptive zoom controller (150) is configured to determine whether the at least one bounding box meets a maximum threshold size. The adaptive zoom controller (150) is configured to expand the at least one bounding box with maximum density in at least one of horizontal and vertical direction until the at least one bounding box reaches the maximum threshold size in case that the at least one bounding box does not meet the maximum threshold size. The adaptive zoom controller (150) is configured to encapsulate the non-key pixels into at least one another bounding box.

In an embodiment, the adaptive zoom controller (150) is configured to generate a first blurred image by upscaling the image and a second blurred image by downscaling the image. the adaptive zoom controller (150) obtains a plurality of differential pixels of a differential image by subtracting pixel values of the first blurred image from pixel values of the second blurred image, and compare a current differential pixel among the plurality of differential pixels with a plurality of neighboring differential pixels adjacent to the current differential pixel. The adaptive zoom controller (150) determines whether the current differential pixel is greater than a predetermined number of the neighboring differential pixels. In case that the current differential pixel is greater than the predetermined number of the neighboring differential pixels, the adaptive zoom controller (150) determines whether the current differential pixel is one of an edge pixel or an corner pixel to be determined as the key pixel. In case that the current differential pixel is one of the edge pixel or the corner pixel, the adaptive zoom controller (150) determines a current pixel corresponding to the current differential pixel as the key pixel in case that the current differential pixel is one of the edge pixel or the corner pixel. The adaptive zoom controller (150) may be configured to determine whether the current differential pixel is one of the edge pixel or the corner pixel by obtaining a ratio of two eigen values of a hessian matrix for the current differential pixel. In case that the ratio is smaller than a predetermined edge threshold, the adaptive zoom controller (150) may determine the current pixel as the key pixel.

In another embodiment, the adaptive zoom controller (150) is configured to generate a first blurred image by upscaling the image and a second blurred image by downscaling the image. The adaptive zoom controller (150) is configured to obtain the plurality of pixels of the image by removing the first blurred image from the second blurred image. The adaptive zoom controller (150) is configured to compare every pixel of the plurality of pixels with a set of neighboring pixels of the plurality of pixels in the image. The adaptive zoom controller (150) is configured to identify at least one of greatest value pixels and second greatest value pixels based on the comparison. The adaptive zoom controller (150) is configured to determine whether at least one of the greatest value pixels and the second greatest value pixels meets an edge threshold. The adaptive zoom controller (150) is configured to obtain at least one of the greatest value pixels and the second greatest value pixels that meets the edge threshold as the key pixels.

In an embodiment, the adaptive zoom controller (150) is configured to determining a zooming process order of the plurality of the segments based on the priority order, determine a first zoom level for an Artificial intelligence (AI) zoom and a second zoom level for a bilinear zoom based on the density of the key pixel in a current segment to be zoomed according to the zooming process order, and perform zoom for the current segment by applying at least one of and the AI zoom and the bilinear zoom according to the determined first zoom level and the second zoom level to adaptively zoom each of the plurality of the segments.

In another embodiment, adaptively zooming each of the segment of the image based on the zoom level and the priority order includes applying the zoom level on each of the segment of the image based on the priority order using at least one of a bilinear zoom mechanism (240) and an Artificial intelligence (AI) zoom mechanism (250) based on the pixel density of the at least one important ROI.

In another embodiment, applying the adaptive zoom on the image includes applying at least one of a single shot interpolation and a step by step interpolation on the at least one important ROI of the image to zoom the image, and generating new pixels in the at least one important ROI based on the at least one of the one shot interpolation and the step by step interpolation. For example, a less important part of the image is zoomed at smaller zoom ratio and a more important part of the image is zoomed at larger zoom ratio. Accordingly, the more important region of the image sensitive to the user is zoomed at a larger zoom ratio, thereby processing power and time can be reduced without noticeable degradation of the zoomed image. By zooming the more important region of the image sensitive to the user at a larger zoom ratio and zooming the less important part of the image at smaller zoom ratio, the pixel computation load may be less than the pixel computation load resulted from all the pixels in the image is zoomed at identical zoom ratio.

The processor (110) is configured to execute instructions stored in the memory (130) and to perform various processes. The memory (130) stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Although the FIG. 1 shows various hardware components of the electronic device (100) but it is to be understood that other embodiments are not limited thereon. In other embodiments, the electronic device (100) may include less or a greater number of components. Further, the labels or names of the components are used only for illustrative purpose and does not limit the scope of the disclosure.

Interesting points corresponding to key pixel candidates on the object or ROI of the image can be extracted by using feature detection algorithm such as SIFT and so on. Information about key pixels included in the image can be determined previously and stored in a database located in the electronic device (100) or remotely located. The adaptive zoom controller (150) is configured to generate image identifiers, hashed keys using a hash function model and a bit map indicating location of key pixels included in each of segments for a plurality of the images. The image identifier indicates an identifier for identifying each of images from the plurality of the images. The hashed key or a certain value obtained by using the hashed key through a predetermined function can be used as the image identifier. The hashed key may be obtained using one or more values obtained from the image. For example, an image is input to the neural network, and the neural network outputs a predetermined dimension of vector corresponding to the image, the vector from the neural network is input to the hash function, and the hashed key is obtained as output of the hash function. The vector of a predetermined dimension through the neural network can be used as a unique key for the image. As mentioned above, a certain value such as the hashed key obtained from the vector may be used as the identifier of the image. The dimension of the vector may be 512 dimension, but not limited to. The dimension of the vector can be changed according to a type of the neural network, and a number of layers included in the neural network. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The adaptive zoom controller (150) may be further configured to store at least one of a segment priority information indicating the priority of the segments included in the image, a size information of each segments, coordinates of each segments and a binary bitmap indicating location of key pixels included in each segments in the data base. The priority of the segments indicates the order in which the segment are processed. The priority of the segments may be determined based on the key pixel density. The higher the key pixel density of the segment, the higher the priority of the segment. The priority of the segments may be indicated by using a raster scan order. It is assumed that segment N (N is integer) indicates N-th segment to be scanned according to the raster scan. For example, in case that 4 segments are included in the image, segment 0, segment 1, segment 2, and segment 3 are sequentially scanned according to the raster scan. In this case, if the priority order of the segments is segment 3, segment 1, segment 0, segment 2, the segment priority information may be [3, 1, 0, 2]. Accordingly, the priority order may be indicated by using the raster scan order number. Similarly, the binary bitmap indicating location of key pixels included in each segments may be indicated by 1-dimensional array including scan order of key pixel. For example, if the binary bitmap of the segment is [1, 3, 4, 6, 12], this binary bitmap indicates that 1st pixel, 3rd pixel, 4th pixel, 6th pixel, and 12th pixel according to a predetermined scan order such as raster scan order, are key pixels.

Figure 2:
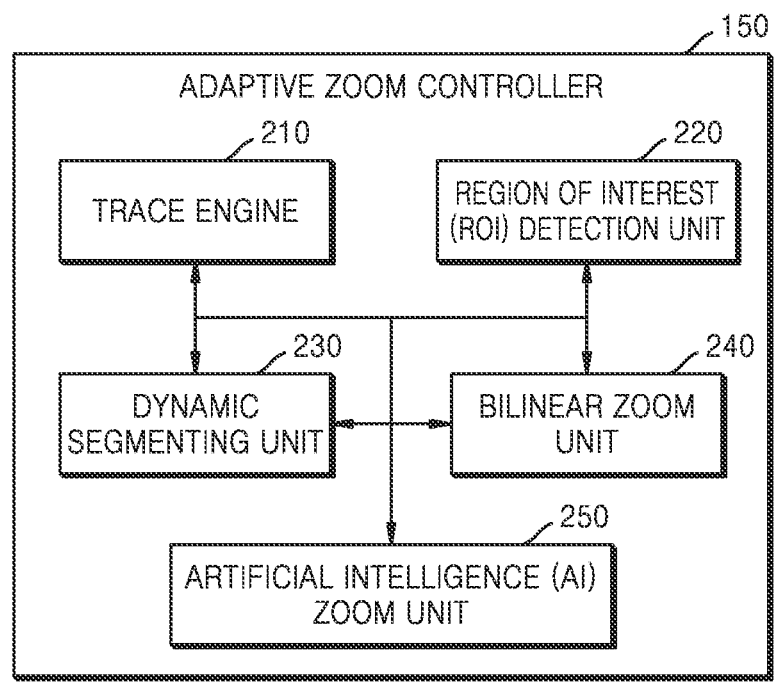
FIG. 2 illustrates an adaptive zoom controller, according to an embodiment.

FIG. 2 illustrates the adaptive zoom controller (150) according to an embodiment as disclosed herein. The adaptive zoom controller (150) includes a trace unit (210), a ROI detection unit (220), a dynamic segmenting unit (230), the bilinear zoom unit (240), and the AI zoom unit (250). In case that the adaptive zoom controller (150) detects at least one input to perform zoom on the image, the trace unit (210) checks a database for the image to be zoomed. If the information for the image to be zoomed has been already stored in the database, then the trace unit (210) obtains the information for the image such as a segment priority information indicating the priority of the segments included in the image, a size information of each segments, coordinates of each segments, the binary bitmap indicating location of key pixels included in each segments.

In case that the information for the image to be zoomed is not stored in the database, the ROI detection unit (220) detects ROIs or key pixels from the image. The ROI or key pixel may of the image can be determined by using feature detection algorithm such as SIFT (scale-invariant feature transform), RIFT (rotation-invariant generalization), Root-SIFT, G-RIF (Generalized Robust Invariant Feature), SURF (Speeded Up Robust Features) and so on, but not limited to the afore-mentioned feature detection algorithm. In an embodiment, the ROI detection unit (220) applies a Gaussian blur on the image to generate two blurred versions of image, and subtracts the two blurred images to obtain a differential image. The ROI detection unit (220) compare a current differential pixel included in the differential image with neighboring 8 differential pixels. In case that the current differential pixel is greater than a predetermined number of the neighboring differential pixels, then the ROI detection unit (220) determines whether the current differential pixel is one of an edge pixel or an corner pixel to be determined as the key pixel using an edge threshold. The edge threshold is used to exclude false key pixel which is close to edges or noisy pixels. To remove the false key pixel, the edge threshold is compared with a ratio of two eigen values of a hessian matrix for the current differential pixel. In case that the ratio is smaller than a predetermined edge threshold, the ROI detection unit (220) determines the current pixel corresponding to the current differential pixel as the key pixel.

In an embodiment, the dynamic segmenting unit (230) assigns bigger segment size for the important ROI. The dynamic segmenting unit (230) determines a size of the segment to include as many adjacent key pixels as possible within the maximum threshold size. After dynamic segmenting and determining key pixels included in each of segments, the information regarding the segments and key pixels is encoded and stored in the database. For example, the dynamic segmenting unit (230) may store the priority of the segments included in the image, a size information of each segments, coordinates of each segments and a binary bitmap indicating location of key pixels included in each segments may be stored in the database.

The adaptive zoom controller (150) may be configured to determine a zooming process order of the plurality of the segments based on the priority order, and determine a first zoom level for an Artificial intelligence (AI) zoom and a second zoom level for a bilinear zoom based on the density of the key pixel in a current segment to be zoomed according to the zooming process order. The AI zoom unit (250) performs zoom for the current segment by applying the AI zoom according to the determined first zoom level and the bilinear zoom unit (240) performs zoom for the current segment by applying bi-linear zoom according to the second zoom level. The AI zoom unit (250) generates an interpolated pixel based on bi-cubic interpolation with assigning a more weight to a neighboring pixel determined as the key pixel. The AI zoom by the AI zoom unit (250) and the bilinear zoom by the bilinear zoom unit (240) may be applied to the segments according to the key pixel density percentage. The zoom level for AI zoom and the zoom level for the bilinear zoom may be changed according to the density of the key pixel in the segment as explained in FIG. 12C. Referring to FIG. 12C, as the density of the key pixel increases, the zoom level for AI zoom may be increase, and as the density of the key pixel decreases, the zoom level for bilinear zoom may be increase instead of the AI zoom. NX (N is integer) indicates the zoom level. Accordingly, the zoom level for AI zoom and the zoom level for the bilinear zoom may be changed according to the density of the key pixel in the segment.

The bilinear zoom unit (240) may be applied on the smaller segment size of the image and the AI zoom unit (250) is applied on the bigger segment size of the image.

At least one of the plurality of modules may be implemented through an AI model. A function associated with AI may be performed through the non-volatile memory, the volatile memory, and the processor.

The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

FIG. 3A illustrates a flow chart of a method for applying adaptive zoom on the image, according to an embodiment. In operation 301, the adaptive zoom controller (150) detects at least one input to perform zoom on the image. User may request to zoom the image by pinch zoom motion in a touch panel of display (140) or by other input means. In case that the processor (110) detects the input to perform the zoom on the image, in operation 302, the adaptive zoom controller (150) determines key pixels in the image. The trace unit (210) checks a database for the image to be zoomed. If the information for the image to be zoomed has been already stored in the database, then the trace unit (210) obtains the information for the image such as a segment priority information indicating the priority of the segments included in the image, a size information of each segments, coordinates of each segments, the binary bitmap indicating location of key pixels included in each segments, and output these information to let these information used in other component. In case that the information for the image to be zoomed is not stored in the database, the ROI detection unit (220) detects ROIs or key pixels from the image. The ROI or key pixel may of the image can be determined by using feature detection algorithm such as SIFT as mentioned above. In operation 303, the dynamic segmenting unit (230) obtains a plurality of segments by determining sizes of each of the plurality of the segments based on a number of the key pixels in each of the plurality of the segments. In operation 304, the adaptive zoom controller (150) determines a priority order for zooming the plurality of the segments based on a density of the key pixels in each of the plurality of the segments. In operation 305, the adaptive zoom controller (150) determines a zoom level to be applied on each of the plurality of the segments based on the density of the key pixels in each of the plurality of the segments. In operation 306, the adaptive zoom controller (150) control the AI zoom unit (250) and the bilinear zoom unit (240) to adaptively zoom each of the plurality of the segments based on the zoom level and the priority order. When a first zoom level is determined for an Artificial intelligence (AI) zoom and a second zoom level is determined for a bilinear zoom based on the density of the key pixel in a current segment to be zoomed, the AI zoom unit (250) performs zoom for the current segment by applying the AI zoom according to the determined first zoom level and the bilinear zoom unit (240) performs zoom for the current segment by applying bi-linear zoom according to the second zoom level.

Figure 3B:
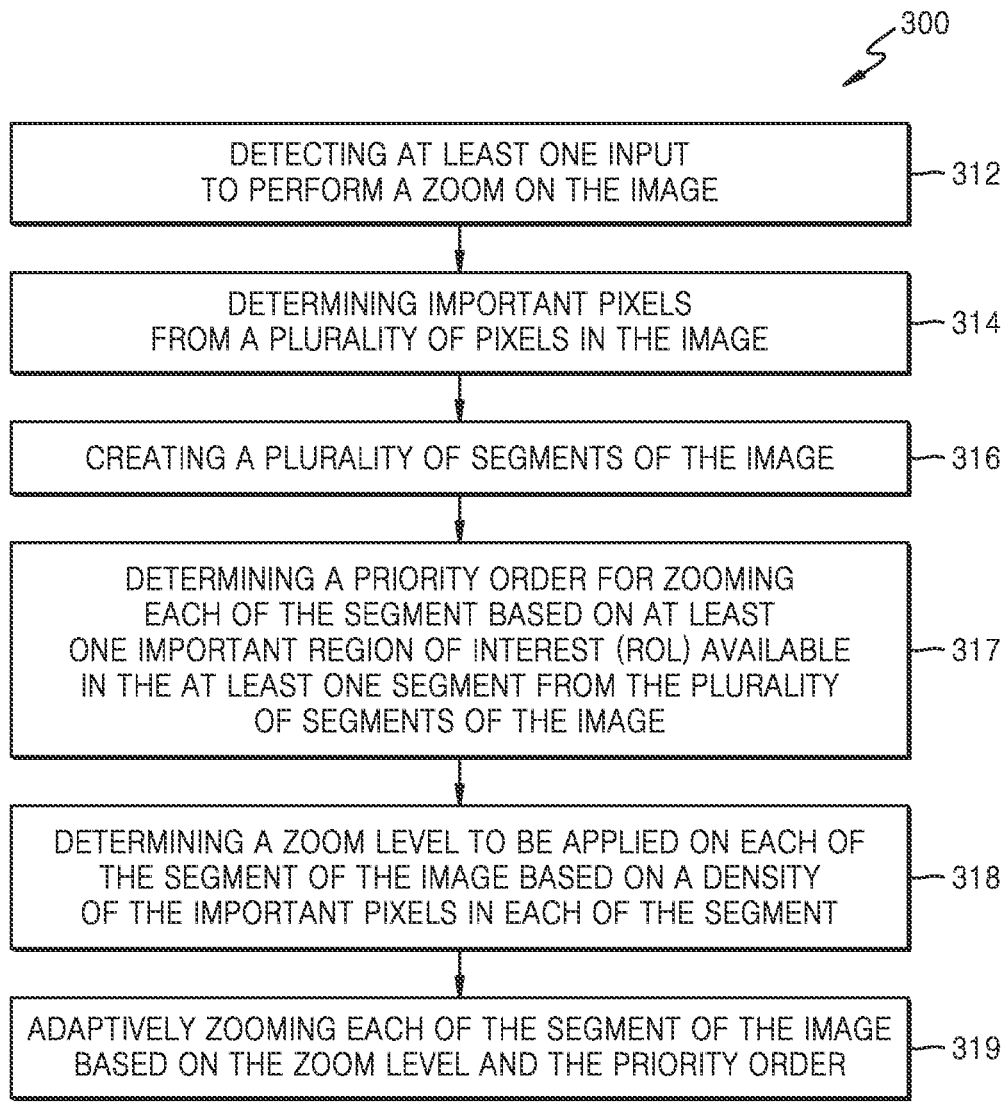
FIG. 3B illustrates a method for applying adaptive zoom on an image, according to an embodiment.

FIG. 3B illustrates a flow chart of a method (300) for applying adaptive zoom on the image, according to another embodiment as disclosed herein. In operation 312, the method (300) includes detecting at least one input to perform a zoom on the image. In operation 314, the method (300) includes determining important pixels from a plurality of pixels in the image. In operation 316, the method (300) includes creating a plurality of segments of the image. In operation 317, the method (300) includes determining a priority order for zooming each of the segment based on at least one important Region of Interest (ROI) available in the at least one segment from the plurality of segments of the image. In operation 318, the method (300) includes determining a zoom level to be applied on each of the plurality of the segment of the image based on a density of the important pixels included in each of the plurality of the segments. In operation 319, the method (300) includes adaptively zooming each of the plurality of the segments based on the zoom level and the priority order.

Figure 3C:
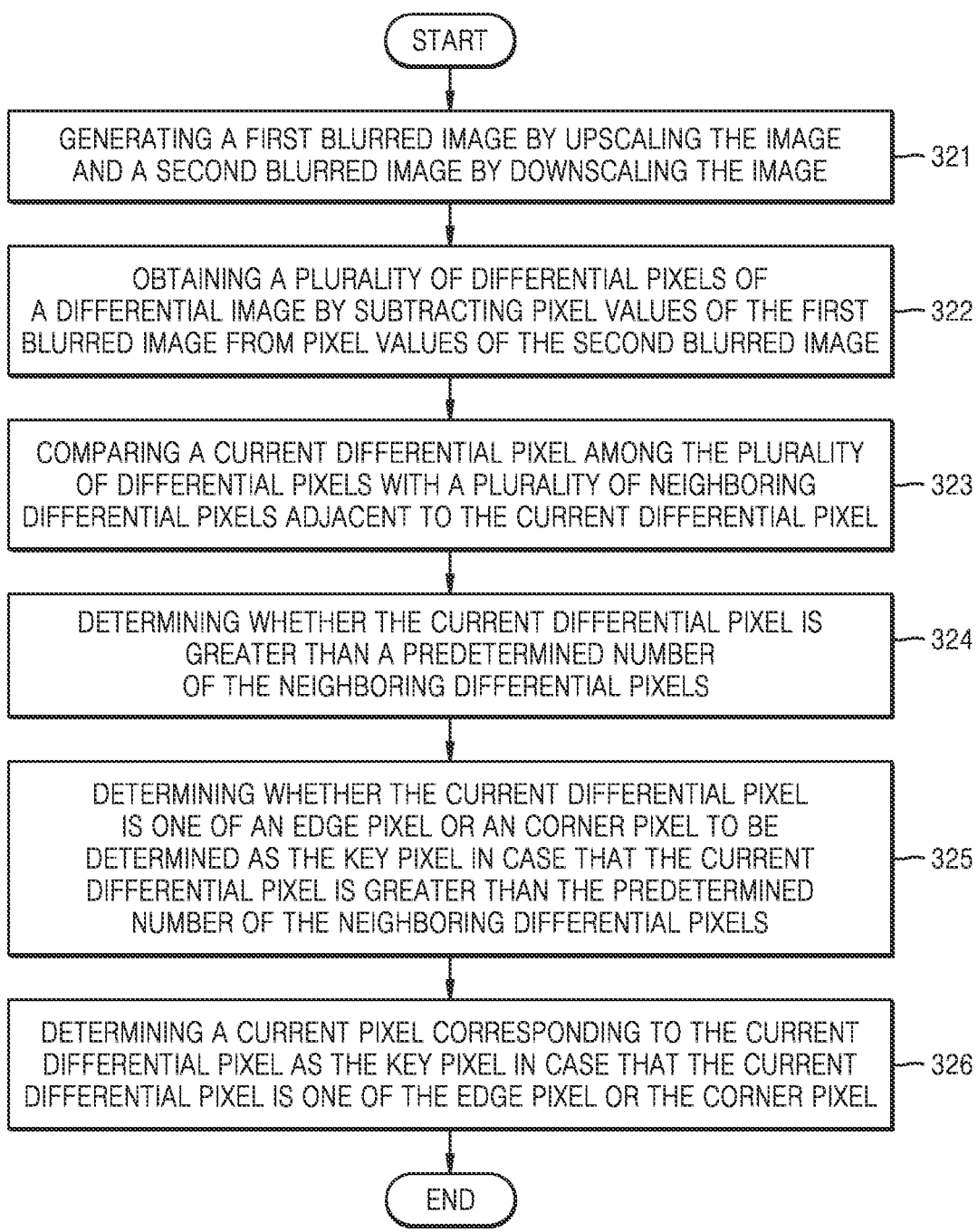
FIG. 3C illustrates a flow chart for determining key pixels, according to the embodiments.

FIG. 3c illustrates a flow chart for determining key pixels, according to the embodiments. In operation 321, the ROI detection unit (220) generates a first blurred image by upscaling the image and a second blurred image by downscaling the image. In operation 322, the ROI detection unit (220) obtains a plurality of differential pixels of a differential image by subtracting pixel values of the first blurred image from pixel values of the second blurred image. In operation 323, the ROI detection unit (220) compares a current differential pixel among the plurality of differential pixels with a plurality of neighboring differential pixels adjacent to the current differential pixel. In operation 324, the ROI detection unit (220) determines whether the current differential pixel is greater than a predetermined number of the neighboring differential pixels. In operation 325, the ROI detection unit (220) determines whether the current differential pixel is one of an edge pixel or an corner pixel to be determined as the key pixel in case that the current differential pixel is greater than the predetermined number of the neighboring differential pixels. In operation 326, the ROI detection unit (220) determines a current pixel corresponding to the current differential pixel as the key pixel in case that the current differential pixel is one of the edge pixel or the corner pixel.

Figure 3D:
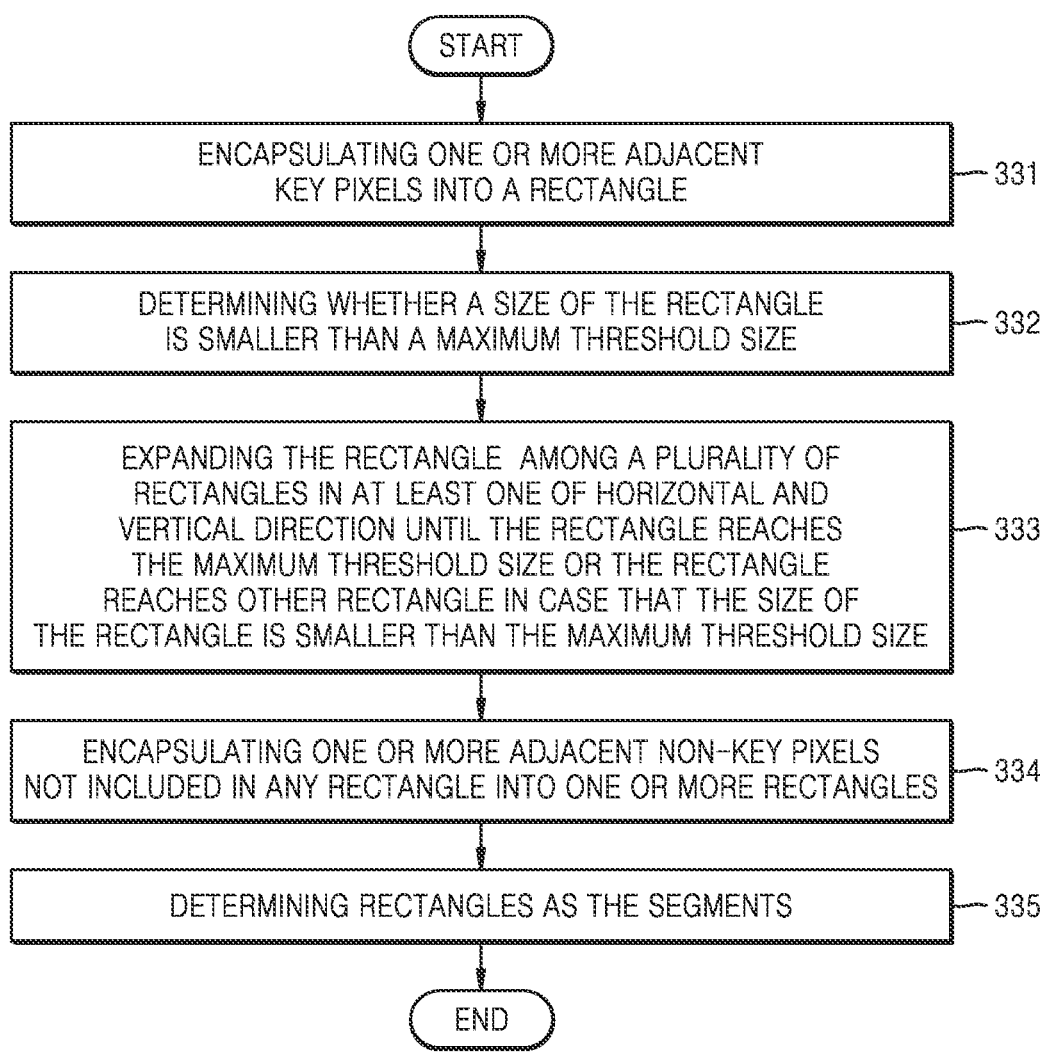
FIG. 3D illustrates a flow chart of a method for determining key pixels according to the embodiments.
Figure 3E:
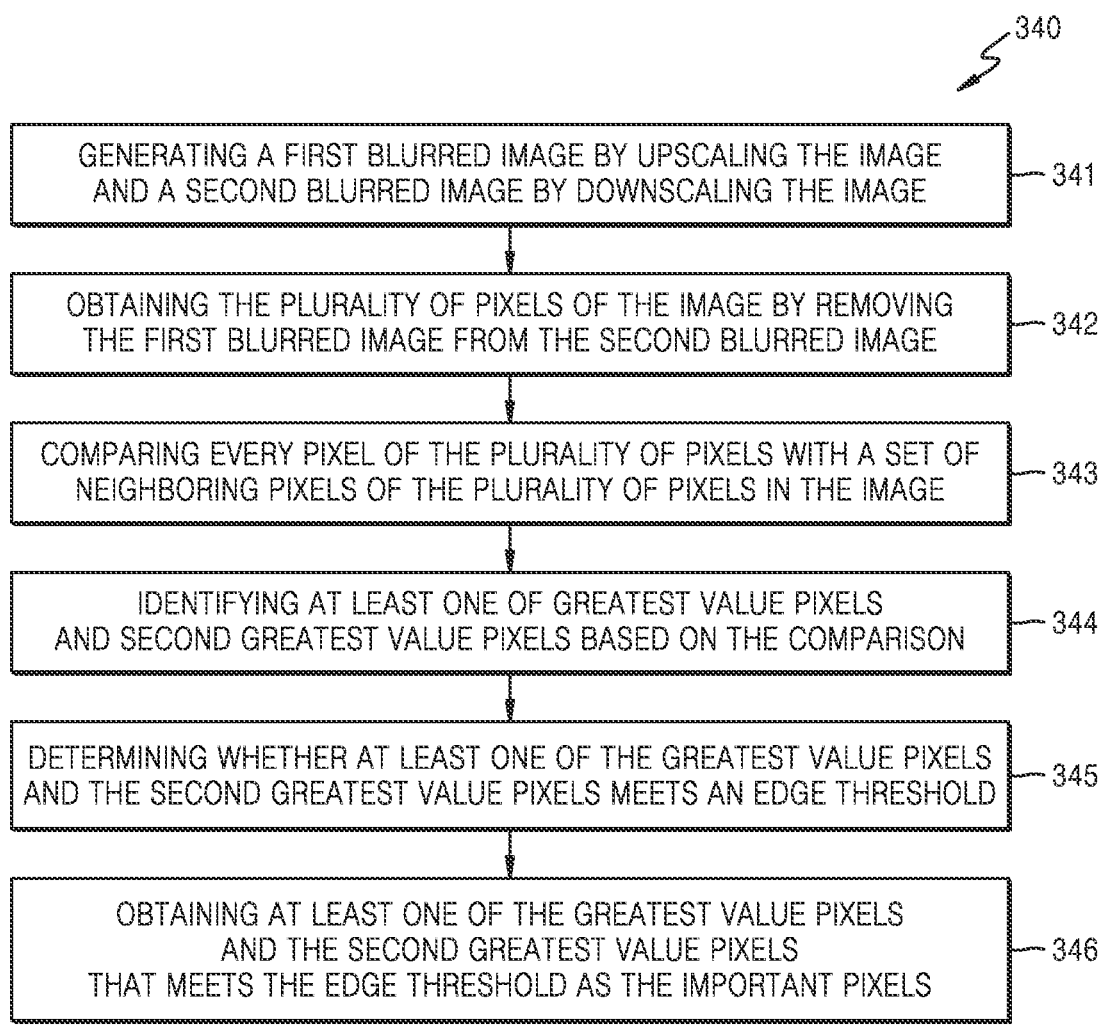
FIG. 3E illustrates a method for determining important pixels of a plurality of pixels in the image, according to the embodiments.

FIG. 3D illustrates a flow chart for determining key pixels according to the embodiments as disclosed herein. In operation 331, the dynamic segmenting unit (230) encapsulating one or more adjacent key pixels into a rectangle. In operation 332, the dynamic segmenting unit (230) determines whether a size of the rectangle is smaller than a maximum threshold size. In operation 333, the dynamic segmenting unit (230) expands the rectangle among a plurality of rectangles in at least one of horizontal and vertical direction until the rectangle reaches the maximum threshold size or the rectangle reaches other rectangle in case that the size of the rectangle is smaller than the maximum threshold size. The maximum threshold size indicates allowable maximum size that the segment can have. An order for expanding the plurality of rectangle may be determined according to the key pixel density of the rectangle. The key pixel density of the rectangle indicates (number of key pixel included in the rectangle/number of all pixels included in the rectangle). For example, assuming that a current rectangle has a size of 3×4 and there are 3 key pixel in the current rectangle, then the key pixel density of the current rectangle is (3/12). The dynamic segmenting unit (230) may firstly expand a rectangle having the highest key pixel density. In operation 334, the dynamic segmenting unit (230) encapsulates one or more adjacent non-key pixels not included in any rectangle into one or more rectangles. In operation 335, the dynamic segmenting unit (230) determines rectangles as the segments. FIG. 3E illustrates a flow chart of a method (340) for determining important pixels of a plurality of pixels, according to the embodiments. In operation 341, the method (340) includes generating a first blurred image by upscaling the image and a second blurred image by downscaling the image. In operation 342, the method (340) obtaining the plurality of pixels of the image by removing the first blurred image from the second blurred image. In operation 343, the method (340) includes comparing every pixel of the plurality of pixels with a set of neighboring pixels of the plurality of pixels in the image. In operation 344, the method (340) includes identifying at least one of greatest value pixels and second greatest value pixels based on the comparison. In operation 345, the method (340) includes determining whether at least one of the greatest value pixels and the second greatest value pixels meets an edge threshold. In operation 346, the method (340) includes obtaining at least one of the greatest value pixels and the second greatest value pixels that meets the edge threshold as the important pixels.

Figure 3F:
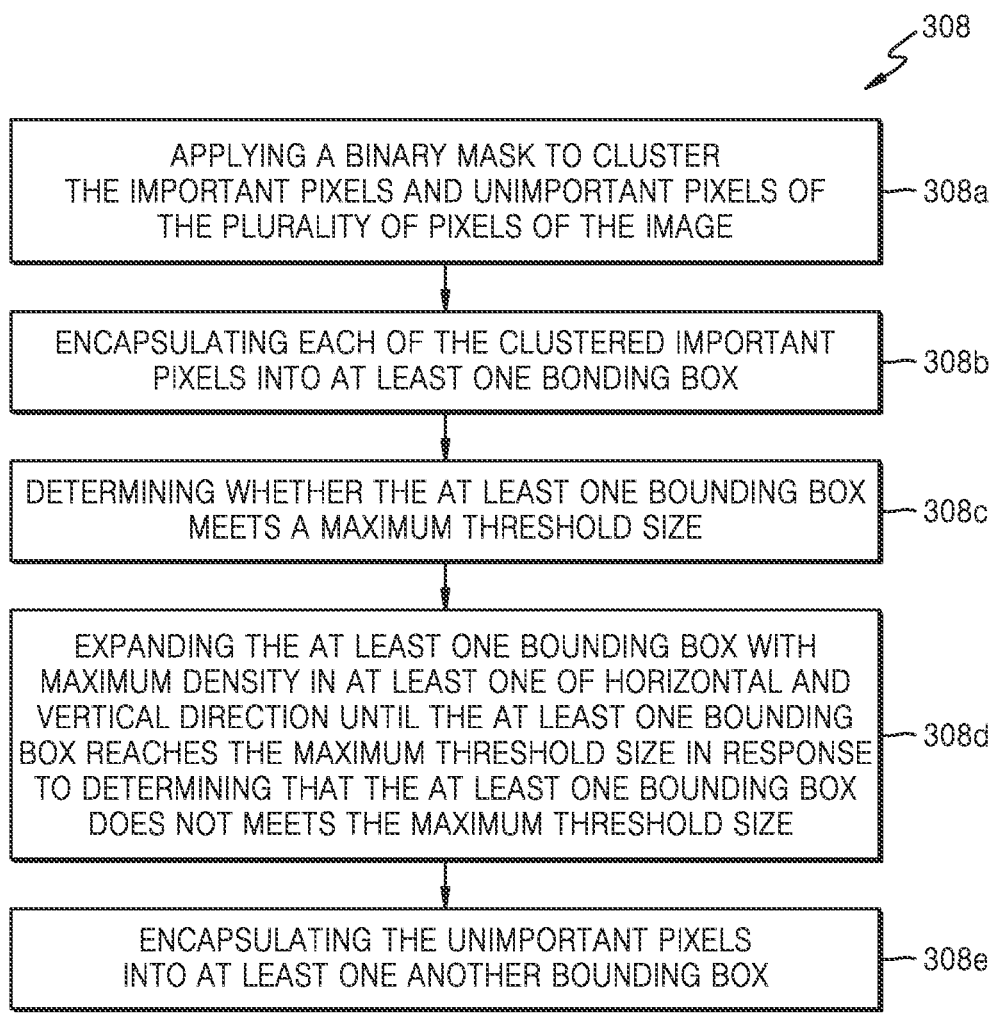
FIG. 3F illustrates a method for determining at least one important ROI from the plurality of pixels, according to the embodiments.

FIG. 3F illustrates a flow chart of a method (330) for determining at least one important ROI from the plurality of pixels, according to the embodiments as disclosed herein. At operation 331, the method (330) includes applying a binary mask to cluster the important pixels and unimportant pixels of the plurality of pixels of the image. At operation 332, the method (330) includes encapsulating each of the clustered key pixels into at least one bonding box. At operation 333, the method (330) includes determining whether the at least one bounding box meets a maximum threshold size. At operation 334, the method (330) includes expanding the at least one bounding box with maximum density in at least one of horizontal and vertical direction until the at least one bounding box reaches the maximum threshold size in response to determining that the at least one bounding box does not meet the maximum threshold size. At operation 335, the method (330) includes encapsulating the non-key pixels into at least one another bounding box.

Figure 4:
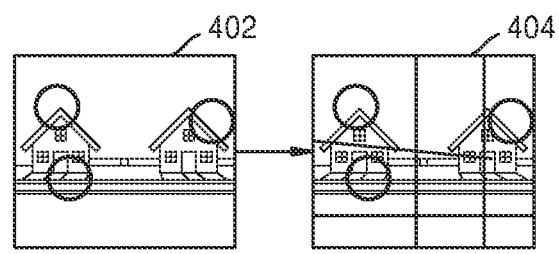
FIG. 4 illustrates an example of obtaining segments of the image, according to the embodiments.

FIG. 4 illustrates an example of obtaining a dynamic segments of the image, according to the embodiments as disclosed herein. The ROI detection unit (220) determines the important ROI and key pixels included in the ROI. Key pixel may indicate a pixel included in an important area such as ROI (Region Of Interest) in the image. Important area indicates an area which has at least one of characteristics such as frequency difference, edge information, color variation, gradient change and so on. Key pixel can be a pixel on an object of the image. For any object in the image, interesting points corresponding to key pixel candidates on the object can be extracted to provide a feature description of the object. In the embodiment, the key pixels included in the object can be determined by using feature detection algorithm such as SIFT. The determined important ROI and key pixels is given to the dynamic segmenting unit (230). For example, the ROI detection unit (220) is used to find important ROI and key pixels in an image (402) that are most likely to be zoomed by the user. The dynamic segmenting unit (230) is used to divide the image (402) into segments (404) depending on a priority of the segments (404) and the key pixel density of the segments so that the segments (404) with a highest priority may be zoomed first. The highest priority means the segments (404) containing ROI or having the highest key pixel density.

Figure 5:
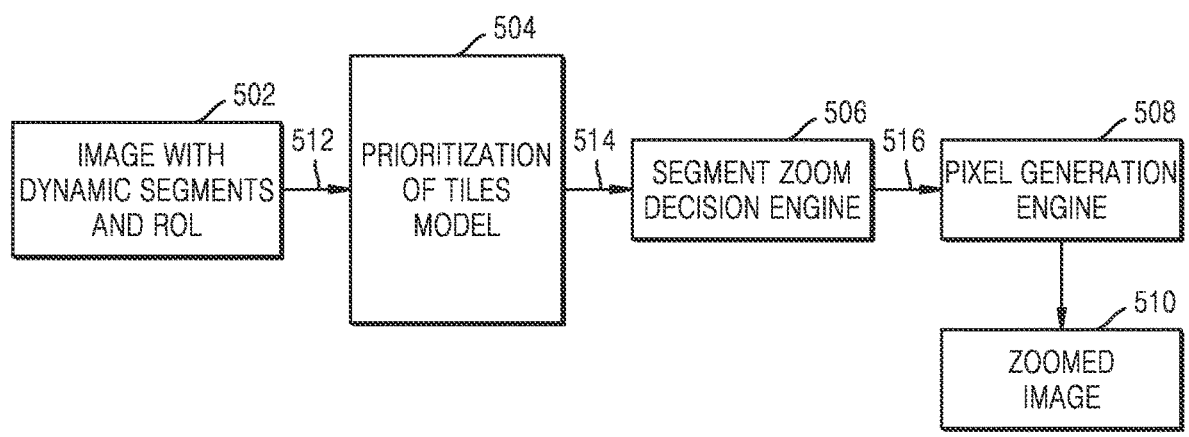
FIG. 5 illustrates an Artificial intelligence (AI) zoom mechanism, according to the embodiments.

FIG. 5 illustrates the Artificial intelligence (AI) zoom unit (250), according to the embodiments as disclosed herein. The AI zoom unit (250) includes a segment zoom decision unit (506) and a pixel generation unit (508). The image with dynamic segmenting and the ROI (502) is given as an input (512) to a prioritization of segments model (504) for prioritizing the input (512) into a high priority segments and a low priority segments. The high priority segments and the low priority segments (514) is given to the segment zoom decision unit (506), where the segment zoom decision unit (506) decides whether to apply the AI zoom unit (250) on the high priority segments or not. The decision (516) from the AI zoom unit (250) is given to the pixel generation unit (508) to zoom the image by generating the new pixels and to obtain a zoomed image (510).

Figure 6:
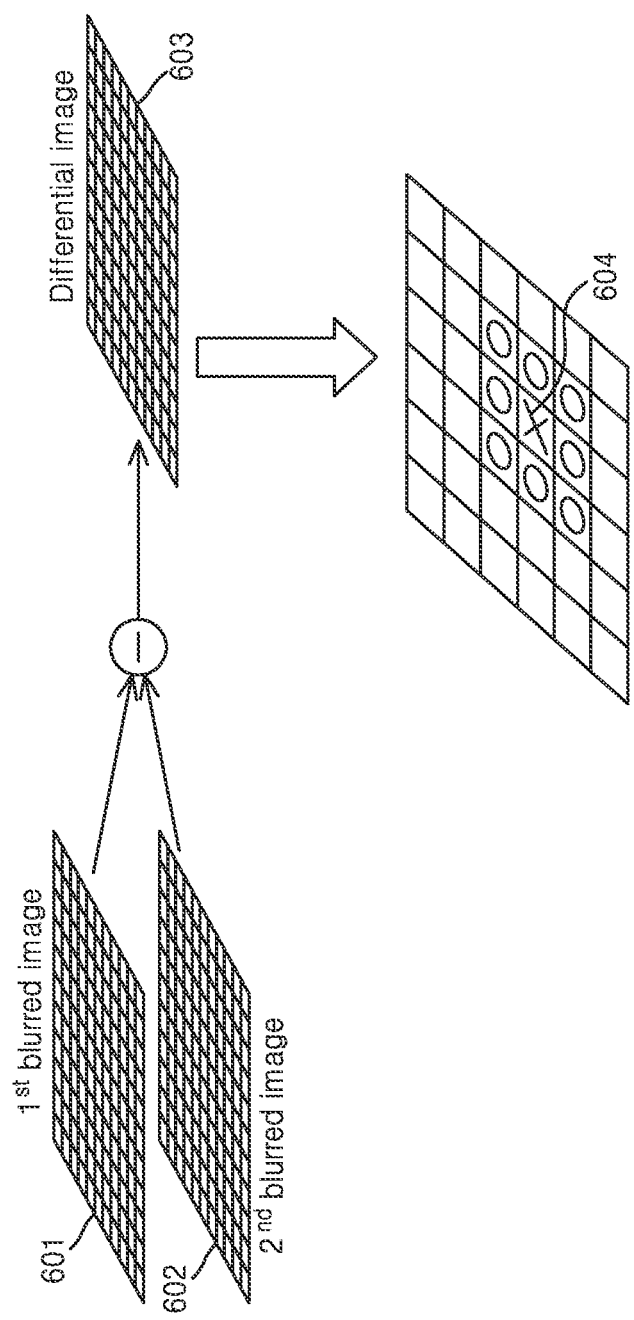
FIG. 6 illustrates a diagram for explaining key pixel detection of the image, according to the embodiments.

FIG. 6 illustrates a diagram for explaining key pixel detection of the image, according to the embodiments. The image is convolved with Gaussian filters at different scales, and then the difference of successive Gaussian-blurred images are taken. Key points are then taken as maxima/minima of the Difference of Gaussians (DoG) that occur at multiple scales. Referring to FIG. 6, the ROI detection unit (220) generates a first blurred image (601) by upscaling the image and a second blurred image (602) by downscaling the image. The ROI detection unit (220) obtains a plurality of differential pixels of a differential image (603) by subtracting pixel values of the first blurred image (601) from pixel values of the second blurred image (602). The differential image (603) may correspond to the Difference of Gaussian (DOG) according to the SIFT algorithm. Key pixel candidates are defined as maxima and minima in the differential image (603). Once the differential image (603), i.e. DoG images have been obtained, key pixel candidates are identified as local minima/maxima of the DoG images across scales. This may be done by comparing each pixel (604) in the differential image (603) to its eight neighbors. If the pixel value is the maximum or minimum among all compared pixels, it is selected as a key pixel candidate.

The DoG function will have strong responses along edges, even if the key pixel candidate is not robust to small amounts of noise. Therefore, in order to increase stability, it is needed to eliminate the key pixel candidate that have poorly determined locations but have high edge responses.

For poorly defined peaks in the DoG function, the principal curvature across the edge would be much larger than the principal curvature along it. Finding these principal curvatures amounts to solving for the eigenvalues of the second-order Hessian matrix, H:

$$H = \begin{bmatrix} D_{xx} & D_{xy} \\ D_{xy} & D_{yy} \end{bmatrix}$$

The eigenvalues of H are proportional to the principal curvatures of D. The ratio R of the two eigenvalues $\lambda 1$ and $\lambda 2$, i.e. $R=\lambda 1/\lambda 2$, may be used to determine an edge threshold to exclude the key pixel candidates from the key pixel. R is minimum when the eigenvalues are equal to each other. Therefore, the higher the absolute difference between the two eigenvalues, which is equivalent to a higher absolute difference between the two principal curvatures of D, the higher the value of R. Thus, the ratio R helps to remove the noise edges and keep the important corners and edges from the calculated key pixel candidates using Difference of Gaussian. For example, the edge threshold may be determined as $Tr(H)^2/Det(H)$, i.e. $(R+1)^2/R$. The ROI detection unit (220) may compare the key pixel candidates with the edge threshold determined based on the ratio R, and exclude the key pixel candidates in case that the ration R for the key pixel candidate is larger than the edge threshold.

Figure 7:
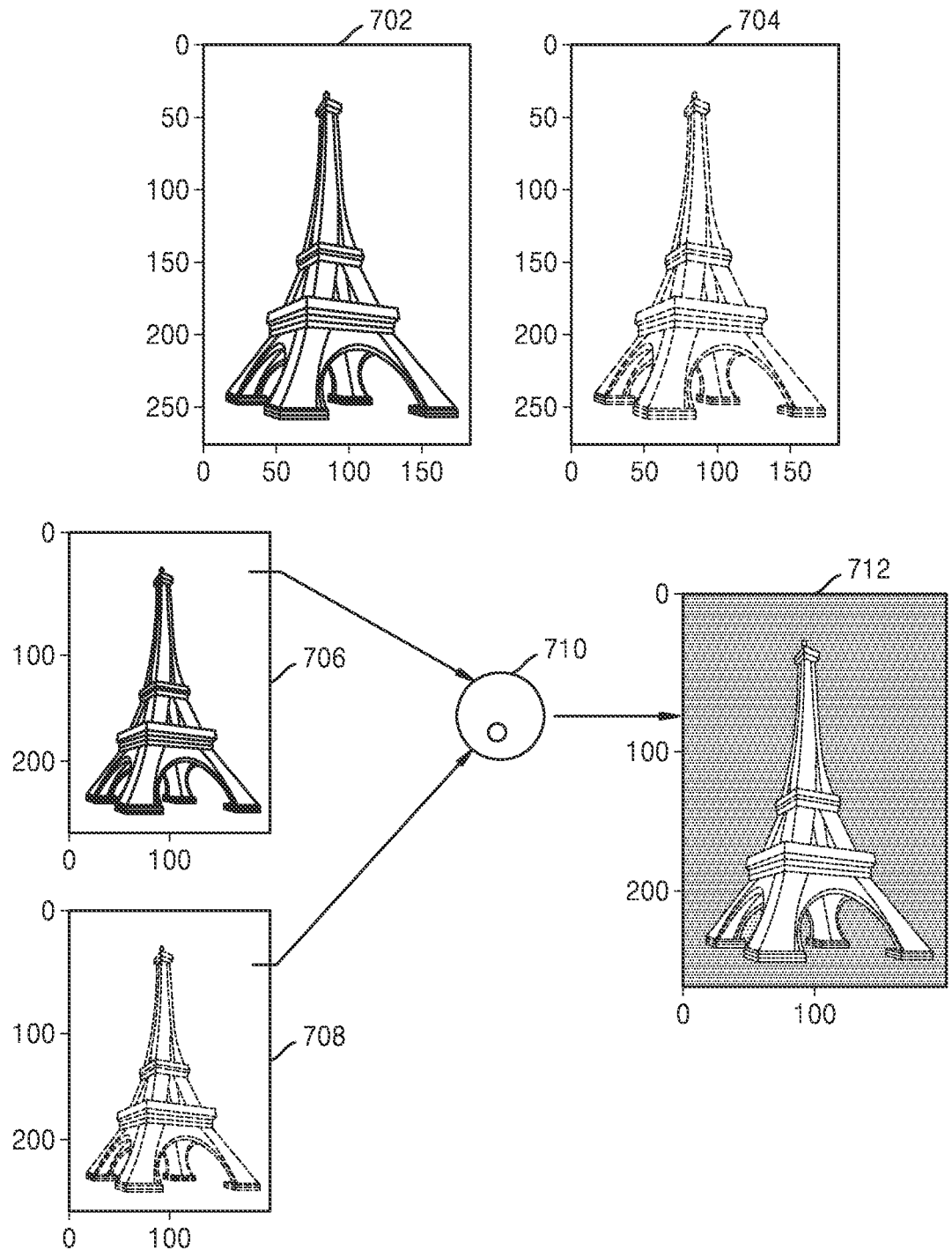
FIG. 7 illustrates an example of identifying the important pixels or key pixels of the image using a gaussian blurring, according to the embodiments.

FIG. 7 illustrates an example of identifying the important ROI or key pixels of the image using a gaussian blurring, according to the embodiments as disclosed herein. An image (702) is zoomed to obtain blurred image (704). The blurred image (704) is upscaled and downscaled to obtain a first blurred image (706) and a second blurred image (708) of different scales. A difference of gaussian images are calculated (710) using the first blurred image (706) and the second blurred image (708) to obtain a plurality of pixels locations and edges in a differential image (712). For example, the SIFT modifies a use of R value. If an intensity of an extrema point is less than a threshold value, then the extrema point rejected. The SIFT removes edges using an eigen values and their ratio (R denotes this ratio) which results in removal of low contrast key pixels and edge points. The R also known as edge threshold which helps to remove a noise edges and keeps important corners and edges from the calculated pixels. The gaussian blurring helps to remove the noise from the images and important features of image is high lightened. The resulting images are an approximation of scale invariant Laplacian of Gaussian. In an embodiment, in order to detect the important ROI or key pixel, each point in pixels is compared to neighboring 8 pixels in the image. The pixel is selected only if the pixel is larger than all of pixels or smaller than all of the pixels.

Figure 8:
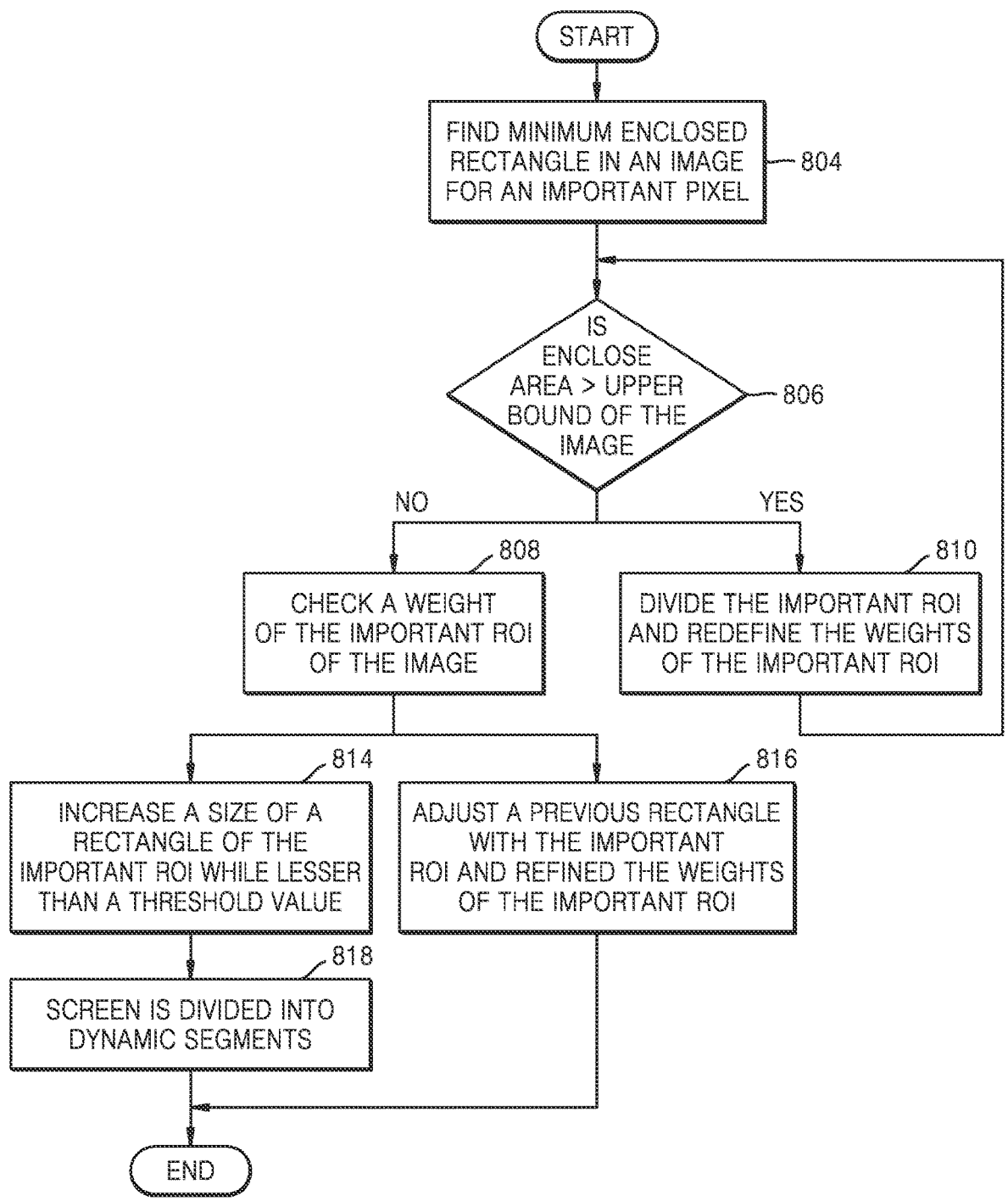
FIG. 8 illustrates a flow chart of obtaining the dynamic segments of the image, according to the embodiments.

FIG. 8 illustrates a flow chart of obtaining the dynamic segmenting of the image, according to the another embodiment as disclosed herein. In operation 804, an image is analyzed to find minimum enclosed rectangle in the segmented image for the ROI. In operation 806, it is determined whether the enclosed area is is greater than an upper bound of the image. In case that the enclosed area is lesser than the upper bound of the image, then a weight between the important ROI and the important ROI is checked in operation 808. In case that the enclosed area is greater than the upper bound of the image, then the important ROI is divided and the weights are redefined for the divided ROI in operation 810. In case that the checked weight of the important ROI is greater than the important, then a size of a rectangle of the important ROI is increased while the size of the rectangle is lesser than a threshold value in operation 814. The checked weight of the important ROI is lesser, then a previous rectangle with the important ROI is adjusted and the weights of the ROI is refined in operation 816.

Figure 9:
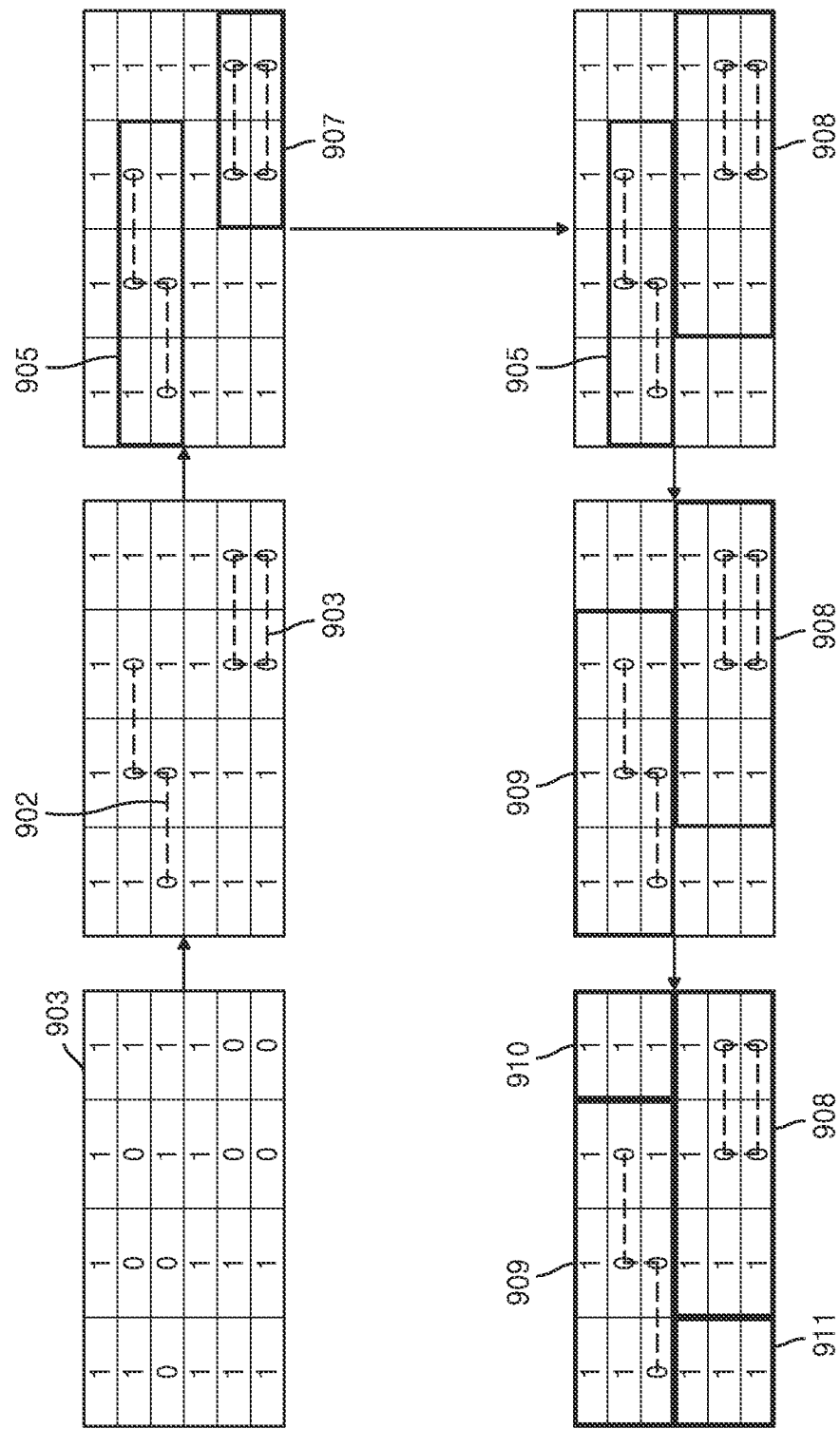
FIG. 9 illustrates an example of the dynamic segmenting based on a density of zeros and ones, according to the embodiments.

FIG. 9 illustrates an example of the dynamic segmenting based on a density of key pixels, according to the embodiments. The dynamic segmenting unit (230) obtains information about key pixel included in the image to be zoomed from the database or the ROI detection unit (220). Based on the information about key pixel, the dynamic segmentation unit (230) can convert the image to be zoomed into binary image (901) as shown in FIG. 9. For simplicity, it is assumed that the size of the image is 4×6. Furthermore, it is assumed that a value of zero indicates key pixel, and a value of 1 indicates non-key pixel, and the maximum threshold size is 3×3, i.e. the maximum segment size is 3×3. To determine segments in the image, adjacent key pixels (902, 903) are connected to each other. Connected adjacent key pixels is encapsulated into a rectangle. For example, referring to FIG. 9, connected adjacent key pixels (902) is encapsulated into a rectangle (905), and connected adjacent key pixels (903) is encapsulated into a rectangle (907). When encapsulating adjacent key pixels, firstly minimum size of the rectangle is used within the maximum threshold size. The key pixel density of the rectangle (905) is 4/6, and the key pixel density of the rectangle (907) is 4/4. The rectangle (907) having higher key pixel density than other rectangle is firstly expanded in at least one of horizontal and vertical direction until the rectangle (907) reaches the maximum threshold size 3×3 or the rectangle reaches other rectangle. Also, the expansion is stopped when the rectangle cannot expand both in horizontal and vertical direction. The rectangle (907) is expanded into a rectangle (908), the rectangle (908) reaches the maximum threshold size 3×3 and the rectangle (908) reaches other rectangle (907). Thus, the expansion of the rectangle (908) is stopped. When the firstly expanded rectangle (907) does not expanded more, the rectangle (905) having a next high key pixel density is expanded. The rectangle (905) is expanded into a rectangle (909), the rectangle (909) reaches the maximum threshold size 3×3 and the rectangle (908) reaches other rectangle (907), thus the rectangle (909) cannot expand anymore. After the expansion process for the rectangles having key pixel is terminated, remaining areas including one or more adjacent non-key pixels not included in any rectangle into one or more rectangles (910, 911).

Figure 10:
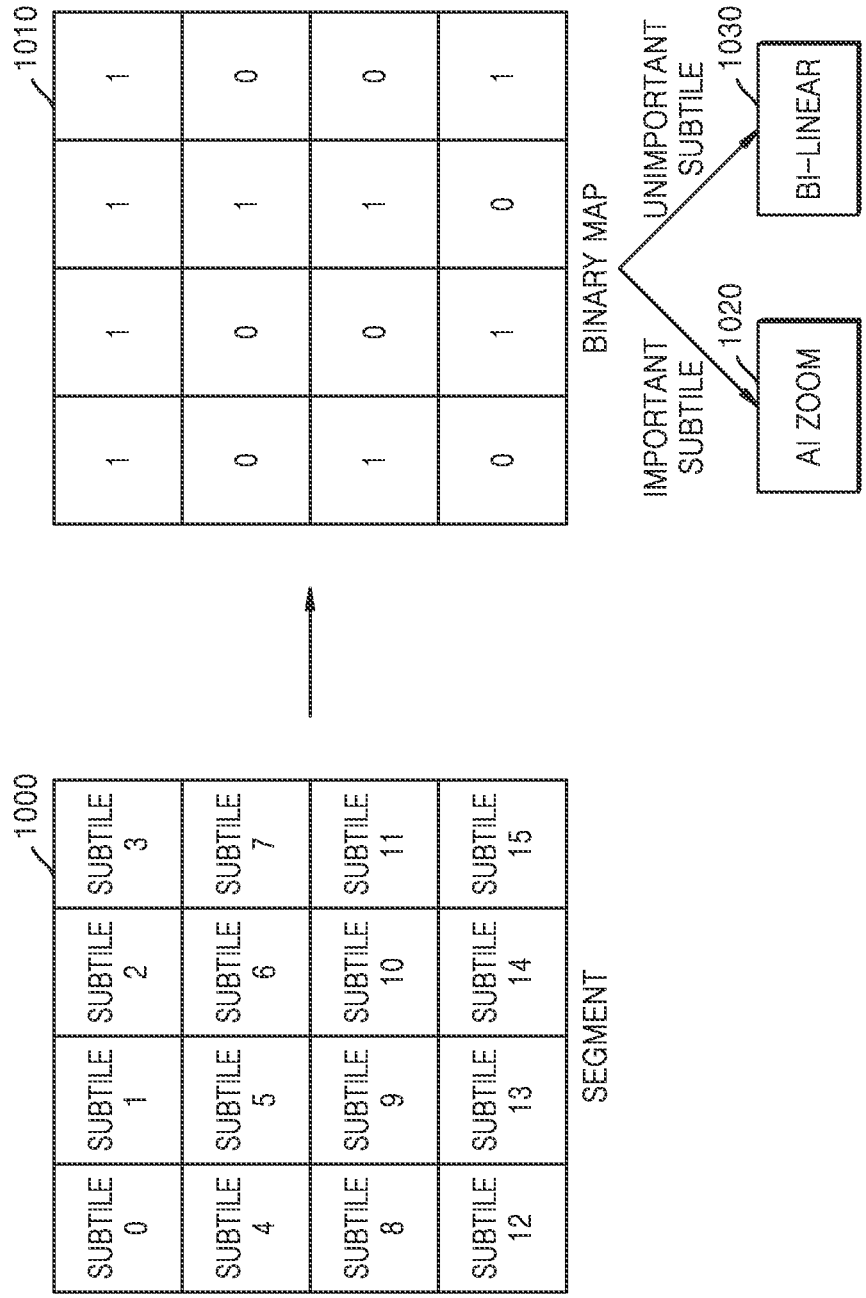
FIG. 10 illustrates an example of classifying sub-tiles included in the segment for applying zooming methods.

FIG. 10 illustrates an example of classifying subtiles included in the segment for applying zooming method according to the embodiment. Each of segments may be divided into subtiles and each of subtiles may be classified into one of important subtile and unimportant subtile. Referring to FIG. 10, a segment (1000) is divided into a plurality of subtiles having a predetermined size. The adaptive zoom controller (150) classifies each of subtiles into one of important subtile and unimportant subtile based on the key pixel density of each of subtiles. The key pixel density of a current subtile is (number of key pixel included in a current subtile/total number of pixel included in the current subtile). In case that the key pixel density of a subtile (EX) is equal to or greater than a predetermined threshold (ET), i.e. EX>=ET, this subtile is classified into important subtile. In case that the key pixel density of a subtile (EX) is less than a predetermined threshold (ET), i.e. EX<ET, this subtile is classified into unimportant subtile. Binary map (1010) indicates an exemplary result of classification. In binary map (1010), a value of one may indicate corresponding subtile is unimportant subtile, and a value of zero may indicate corresponding subtile is important subtile. Thus, in binary map (1010), subtiles 0, 1, 2, 3, 6, 8, 10, 13 and 15 are unimportant subtiles, and other subtiles 4, 5, 7, 9, 11, 12 and 14 are important subtiles. After classifying the subtiles, the adaptive zoom controller (150) applies AI zoom (1020) to the important subtiles, and applies bi-linear zoom (1030) to the unimportant subtiles. By applying different zooming method to the subtiles, it is possible to make use of multi-cores for better and fast results.

Figure 11:
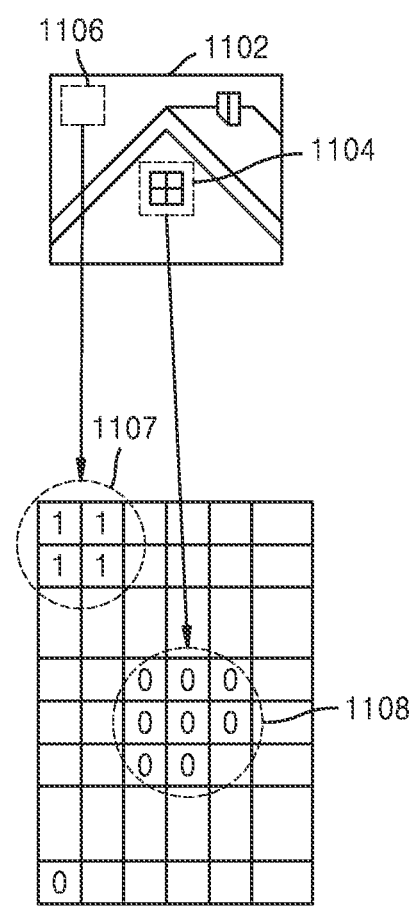
FIG. 11 illustrates an example of classifying key pixel and non-key pixel from the image according to the embodiments.

FIG. 11 illustrates an example of classifying key pixel and non-key pixel from the image according to the embodiments. For example, it is assumed that region (1106) is non-important area, and region (1104) is important area. Pixels included in the non-important region (1106) are classified into non-key pixels, and pixels included in the important region (1104) are classified into key pixels. The key pixels may be indicated as clustered binary values of zeros (1107), and non-key pixels may be indicated as clustered binary values of ones (1108). An amount of zoom at the segment depends on the key pixel density, i.e. the density of zeros and ones in the segment. Thus, the key pixel density can be obtained by (number of zeros/total number of pixel) for the segment. As shown in FIG. 11, the binary mask may be used to indicate the key pixels and non-key pixels where zeros are representing key pixels and the ones are representing as non-key pixels (for example Density Percentage=Density*100). A density percentage is linearly related to amount of zoom on the pixels.

Figure 12A:
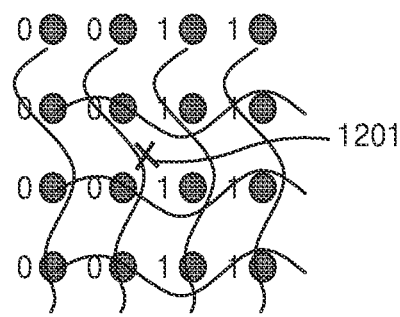
FIG. 12A illustrates an example of the AI zoom mechanism, applied on important pixels of the image, according to the embodiments.

FIG. 12A illustrates an example of the AI zoom mechanism, applied on pixels of the image, according to the embodiments. The AI zoom mechanism according to the embodiment is based on the bicubic method, but the AI zoom mechanism according to the embodiment is further configured to generate an interpolated pixel with assigning a more weight to a neighboring pixel determined as the key pixel. Referring to FIG. 12A, an intermediate pixel (1201) is generated using the nearest 16 neighboring pixels. A value of the intermediate pixel (1201) may be generated by interpolating nearest 4×4 neighboring pixels.

Figure 12B:
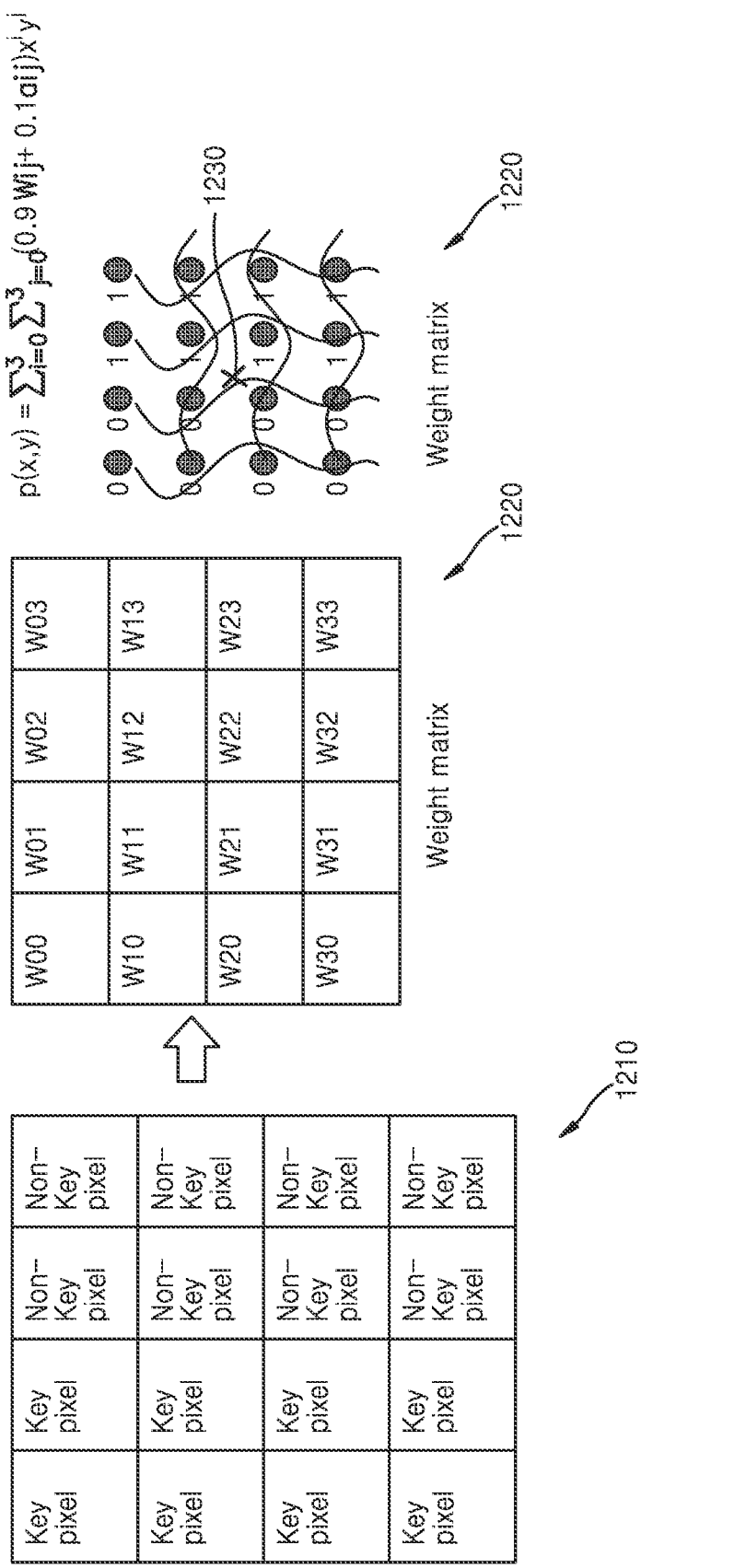
FIG. 12B illustrates an exemplary table including a zoom level for AI zoom and a zoom level for a bilinear zoom based on the density of the key pixel in the segment.
Figure 12C:
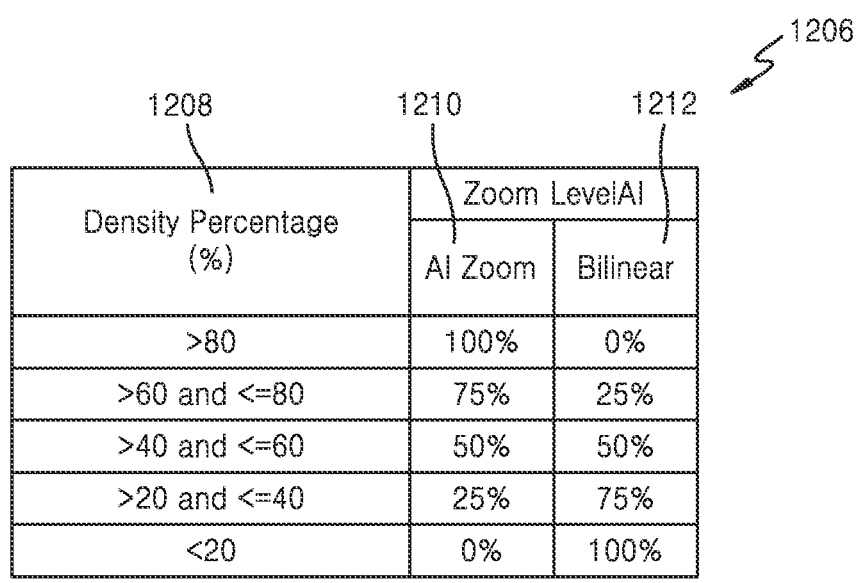
FIG. 12C illustrates an exemplary table including a zoom level for AI zoom and a zoom level for a bilinear zoom based on the density of the key pixel in the segment.

FIG. 12B illustrates a weight matrix to be used in the AI zoom mechanism according to the embodiments. Assuming that a current segment (1210) has key pixels and non-key pixels as shown in FIG. 12B. Weight matrix (1220) includes weights Wij to be used when applying the AI zoom mechanism for assigning a more weight to a neighboring pixel determined as the key pixel. For neighboring pixel determined as the key pixel, one is assigned as weight. For neighboring pixel determined as the non-key pixel, zero is assigned as weight. An intermediate pixel p (x,y) may be generated by following equation:

$$p(x, y) = \sum_{i=0}^{3}\sum_{j=0}^{3}(0.9 Wij + 0.1 aij)x^i y^j$$

In the above equation, Wij indicates a weight of the neighboring pixel located on i-th row and j-th column, and aij indicates a pixel value of the neighboring pixel located on i-th row and j-th column. $x^i$ is the value of each row divided by row scale factor according to the bicubic interpolation method, and $y^j$ is the value of each row divided by row scale factor according to the bicubic interpolation method. AI zoom gives more importance to important pixels and less to non important using the weight matrix.

FIG. 12C illustrates an exemplary table including a zoom level for AI zoom and a zoom level for a bilinear zoom based on the density of the key pixel in the segment.

Referring to FIG. 12C, as the density of the key pixel increases, the zoom level for AI zoom may be increase, and as the density of the key pixel decreases, the zoom level for bilinear zoom may be increase instead of the AI zoom. NX (N is integer) indicates the zoom level. For example, a segment having a size of A×B (A and B are integers) is enlarged (zoomed) into an enlarged segment having a size of AN×BN according to the NX zoom level. It is assumed that there is an input to enlarge (zoom) the segment at a zoom level 16X. In case that the density of the key pixel included in the segment to be zoomed is larger than 80%, only AI zoom is applied to the segment, and the segment is enlarged at a zoom level 16X. In case that the density of the key pixel included in the segment to be zoomed is larger than 60%, and equal to or smaller than 80%, then AI zoom level is determined 12X corresponding to the 75% of the zoom level 16X, and the bilinear zoom level is 4X corresponding to the 25% of the zoom level 16X. Accordingly, the zoom level for AI zoom and the zoom level for the bilinear zoom may be changed according to the density of the key pixel in the segment.

Figure 13A:
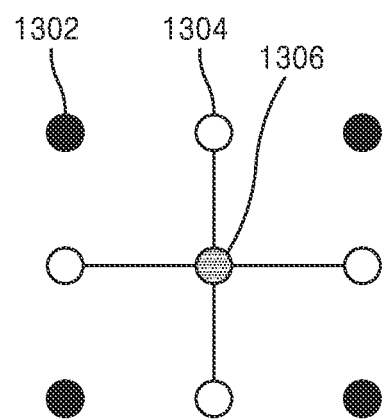
FIG. 13A illustrates an example of generating new pixels using a step by step interpolation, according to the embodiments.
Figure 13B:
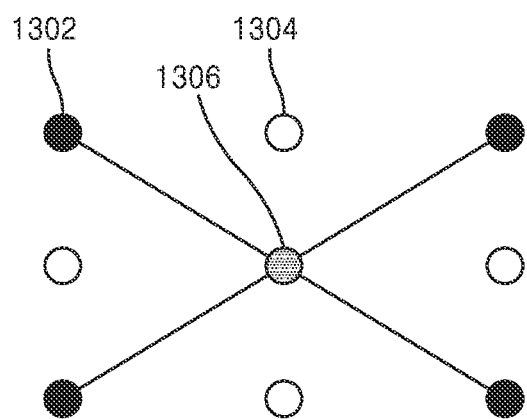
FIG. 13B illustrates an example of generating the new pixels using one shot interpolation, according to the embodiments.

FIG. 13B illustrates an example of generating new pixels using a step by step interpolation, according to the embodiments. According to a step by step interpolation, temporary neighboring pixels (1304) located between original pixels are generated, and the generated temporary neighboring pixels (1304) is used to generate new pixel (1306). According to the step by step interpolation, more process and time are needed because the temporary neighboring pixels (1304) should be generated.

FIG. 13B illustrates an example of generating the new pixels using one shot interpolation, according to the embodiments. According to the one shot interpolation, temporary neighboring pixels (1304) is not generated, and only the original neighboring pixels (1302) are used to generate new pixel (1306). The function for generating new pixel (1306) can be determined according to interpolation method. To reduce process time, this one shot interpolation method may be applied to the bilinear interpolation. Thus, the bilinear zoom generates the interpolated pixel by one shot interpolation using a plurality of original pixels in a single step.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for applying an adaptive zoom on an image, the method comprising:
    identifying one or more key pixels in the image;
    dividing the image into a plurality of segments;
    determining, for each respective segment of the plurality of segments, a size of the respective segment based on a number of the one or more key pixels located within the respective segment;
    determining a priority order for zooming each segment of the plurality of the segments based on a density of the one or more key pixels located within each respective segment of the plurality of the segments;
    determining, for each respective segment of the plurality of segments, a zoom level to be applied to the respective segment based on the density of the one or more key pixels located within the respective segment; and
    adaptively zooming each respective segment of the plurality of the segments based on the determined zoom level and the determined priority order.

2. The method for applying an adaptive zoom on an image of claim 1, wherein each segment of the plurality of segments comprises a rectangle, and wherein the dividing the image into the plurality of the segments comprises:
    identifying one or more groups of adjacent key pixels from among the identified one or more key pixels;
    encapsulating the one or more of the identified groups of adjacent key pixels within one or more segments of the plurality of segments;
    determining, for each respective segment of the plurality of segments, whether a size of the respective segment is smaller than a maximum threshold size;
    for each respective segment determined to have a size smaller than the maximum threshold size, expanding the respective segment in at least one of a horizontal direction and a vertical direction until the respective segment reaches the maximum threshold size or a boundary of the respective segment reaches a boundary of another segment from among the plurality of segments; and
    encapsulating one or more adjacent non-key pixels not included in a segment of the plurality of segments within a segment of the plurality of segments.

3. The method for applying an adaptive zoom on an image of claim 1, wherein the determining one or more key pixels of the image comprises:
    generating a first blurred image by upscaling the image;
    generating a second blurred image by downscaling the image;
    obtaining a plurality of differential pixels of a differential image by subtracting pixel values of the first blurred image from pixel values of the second blurred image;

comparing a current differential pixel from among the plurality of differential pixels with a plurality of neighboring differential pixels adjacent to the current differential pixel;

determining whether the current differential pixel is greater than a predetermined number of the plurality of neighboring differential pixels;

determining whether the current differential pixel is an edge pixel or a corner pixel; and based on determining that the current differential pixel is greater than the predetermined number of the plurality of neighboring differential pixels and also determining that the current differential pixel is the edge pixel or the corner pixel, identifying a current pixel of the image corresponding to the current differential pixel and identifying the current pixel as a key pixel among the one or more key pixels.

4. The method for applying an adaptive zoom on an image of claim 3, wherein the determining whether the current differential pixel is the edge pixel or the corner pixel comprises:

obtaining a ratio of two eigen values of a hessian matrix for the current differential pixel; and based on the ratio being smaller than a predetermined edge threshold, identifying the current pixel as a key pixel among the one or more key pixels.

5. The method for applying an adaptive zoom on an image of claim 1, wherein adaptively zooming each respective segment of the plurality of the segments based on the determined zoom level and the determined priority order comprises:

determining, for each respective segment of the plurality of segments in an order based on the determined priority order, a first zoom level for an Artificial intelligence (AI) zoom and a second zoom level for a bilinear zoom based on the density of the one or more key pixels located within the respective segment; and performing zoom, on each respective segment of the plurality of segments, by applying at least one of the AI zoom and the bilinear zoom according to the determined first zoom level and the second zoom level for the respective segment.

6. The method for applying an adaptive zoom on an image of claim 5, wherein the AI zoom generates an interpolated pixel based on bi-cubic interpolation with assigning a greater weight to a neighboring pixel determined to be a key pixel among the one or more key pixels.

7. The method for applying an adaptive zoom on an image of claim 5, wherein the bilinear zoom generates an interpolated pixel by one shot interpolation using a plurality of original pixels in a single step.

8. The method for applying an adaptive zoom on an image of claim 1, further comprising:

generating, for a plurality of images, a plurality of image identifiers, a plurality of hashed keys using a hash function model, and a bit map indicating location of one or more key pixels; and storing the plurality of image identifiers, the plurality of hashed keys, and the bitmap of the plurality of images in a database.

9. The method for applying an adaptive zoom on an image of claim 8, wherein each hashed key of the plurality of hashed keys is a unique key associated with a respective image of the plurality of the images, and the plurality of image identifiers comprise a plurality of bit arrays indicating features of each of the plurality of the images obtained by a neural network and at least one of a segment coordinates, a segment priority information, and a binary bitmap.

10. An electronic device for applying adaptive zoom on an image, the electronic device comprising:

at least one memory;

at least one processor; and an adaptive zoom controller communicatively connected to the at least one memory and the at least one processor, wherein the adaptive zoom controller is configured to:

identify one or more key pixels in the image;

divide the image into a plurality of segments;

determine, for each respective segment of the plurality of segments, a size of the respective segment based on a number of the one or more key pixels located within the respective segment;

determine a priority order for zooming each segment of the plurality of the segments based on a density of the one or more key pixels located within each respective segment of the plurality of the segments;

determine, for each respective segment of the plurality of segments, a zoom level to be applied to the respective segment based on the density of the one or more key pixels located within the respective segment; and adaptively zoom each respective segment of the plurality of the segments based on the determined zoom level and the determined priority order.

11. The electronic device for applying adaptive zoom on an image of claim 10, wherein each segment of the plurality of segments comprises a rectangle, and wherein, to obtain the plurality of segments, the adaptive zoom controller is further configured to:

identify one or more groups of adjacent key pixels from among the identified one or more key pixels;

encapsulate the one or more of the identified groups of adjacent key pixels within one or more segments of the plurality of segments;

determine, for each respective segment of the plurality of segments, whether a size of the respective segment is smaller than a maximum threshold size;

for each respective segment determined to have a size smaller than the maximum threshold size, expand the respective segment in at least one of a horizontal direction and a vertical direction until the respective segment reaches the maximum threshold size or a boundary of the respective segment reaches a boundary of another segment from among the plurality of segments; and encapsulate one or more adjacent non-key pixels not included in a segment of the plurality of segments within a segment of the plurality of segments.

12. The electronic device for applying adaptive zoom on an image of claim 10, wherein, to determine the one or more key pixels, the adaptive zoom controller is further configured to:

generate a first blurred image by upscaling the image;

generate a second blurred image by downscaling the image;

obtain a plurality of differential pixels of a differential image by subtracting pixel values of the first blurred image from pixel values of the second blurred image;

compare a current differential pixel from among the plurality of differential pixels with a plurality of neighboring differential pixels adjacent to the current differential pixel;

determine whether the current differential pixel is greater than a predetermined number of the plurality of neighboring differential pixels;

determine whether the current differential pixel is an edge pixel or a corner pixel;

based on determining that the current differential pixel is greater than the predetermined number of the plurality of neighboring differential pixels and also determining that the current differential pixel is the edge pixel or the corner pixel, identify a current pixel of the image corresponding to the current differential pixel and identify the current pixel as a key pixel among the one or more key pixels.

13. The electronic device for applying adaptive zoom on an image of claim 10, wherein the adaptive zoom controller is further configured to obtain a ratio of two eigen values of a hessian matrix for the current differential pixel, and based on the ratio being smaller than a predetermined edge threshold, identify the current pixel as a key pixel among the one or more key pixels.

14. The electronic device for applying adaptive zoom on an image of claim 10, wherein the adaptive zoom controller is further configured to:

determine, for each respective segment of the plurality of segments in an order based on the determined priority order, a first zoom level for an Artificial intelligence (AI) zoom and a second zoom level for a bilinear zoom based on the density of the one or more key pixels located within the respective segment; and perform zoom, on each respective segment of the plurality of segments, by applying at least one of the AI zoom and the bilinear zoom according to the determined first zoom level and the second zoom level for the respective segment.

15. The electronic device for applying adaptive zoom on an image of claim 10, wherein the adaptive zoom controller is configured to:

generate, for a plurality of images, a plurality of image identifiers, a plurality of hashed keys using a hash function model, and a bit map indicating location of the one or more key pixels; and store the plurality of image identifiers, the plurality of hashed keys, and the bit map of the plurality of images in a database.

* * * * *